United States Patent
Cheung et al.

(10) Patent No.: US 10,492,038 B2
(45) Date of Patent: *Nov. 26, 2019

(54) METHOD AND APPARATUS TO MANAGE MESSAGING PROVIDING DIFFERENT COMMUNICATION MODES DEPENDING ON ONE IDENTIFIER AND NOT REQUIRING TO DISCLOSE CONTACT INFORMATION

(71) Applicant: IpVenture, Inc., Los Altos, CA (US)

(72) Inventors: Kwok Wai Cheung, Tai Po (HK); Peter P. Tong, Mountain View, CA (US); C. Douglass Thomas, Saratoga, CA (US)

(73) Assignee: IpVenture, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,181

(22) Filed: Sep. 14, 2017

(65) Prior Publication Data

US 2018/0014169 A1    Jan. 11, 2018

Related U.S. Application Data

(63) Continuation of application No. 15/469,440, filed on Mar. 24, 2017, now Pat. No. 10,142,810, which is a
(Continued)

(51) Int. Cl.
*H04W 4/14* (2009.01)
*G06Q 10/10* (2012.01)
(Continued)

(52) U.S. Cl.
CPC ............. *H04W 4/14* (2013.01); *G06Q 10/10* (2013.01); *H04M 3/436* (2013.01);
(Continued)

(58) Field of Classification Search
CPC ........ H04M 2203/651; H04M 3/42059; H04M 3/42093
(Continued)

(56) References Cited

U.S. PATENT DOCUMENTS

| | | |
|---|---|---|
| 5,425,516 A | 6/1995 | Daines |
| 5,548,636 A | 8/1996 | Bannister et al. |

(Continued)

FOREIGN PATENT DOCUMENTS

| | | |
|---|---|---|
| CN | 1453981 | 11/2003 |
| WO | WO 01/45343 A2 | 6/2001 |

OTHER PUBLICATIONS

Notice of Allowance for U.S. Appl. No. 12/798,995 dated Sep. 29, 2011.
(Continued)

*Primary Examiner* — Kiet M Doan

(57) ABSTRACT

A number of embodiments regarding computer-implemented systems and methods to manage electronic communications are disclosed. In one embodiment, an apparatus, using at least a network-based portal based on Internet protocol, provides different communication modes to a first user, with messages eligible to be received by a second user based on any of the modes, depending on an identifier associated with the second user; and receives an indication from the first user to select a communication mode for a message for the second user. In the embodiment, the apparatus could receive contact information associated with the second user to allow the second user to participate, with the contact information not provided to the first user even when the message is received by the second user, and with the contact information being distinct from the identifier.

70 Claims, 9 Drawing Sheets

Related U.S. Application Data continuation of application No. 14/922,344, filed on Oct. 26, 2015, now Pat. No. 9,736,664, which is a continuation of application No. 14/272,632, filed on May 8, 2014, now Pat. No. 9,204,268, which is a continuation of application No. 12/798,995, filed on Apr. 14, 2010, now Pat. No. 8,744,407, which is a continuation of application No. 11/452,115, filed on Jun. 12, 2006, now Pat. No. 7,729,688, which is a continuation-in-part of application No. 11/006,343, filed on Dec. 7, 2004, now Pat. No. 7,116,976.

(60) Provisional application No. 60/527,565, filed on Dec. 8, 2003, provisional application No. 60/689,686, filed on Jun. 10, 2005.

(51) Int. Cl.
H04M 3/436 (2006.01)
H04W 4/16 (2009.01)
H04W 4/12 (2009.01)

(52) U.S. Cl.
CPC ........... *H04M 3/4365* (2013.01); *H04W 4/12* (2013.01); *H04W 4/16* (2013.01); *H04M 2201/60* (2013.01); *H04M 2203/2011* (2013.01); *H04M 2203/651* (2013.01); *H04M 2207/18* (2013.01)

(58) Field of Classification Search
USPC .............. 455/417, 414.1, 466, 412.2, 435.3; 379/88.16, 390.01, 207.04
See application file for complete search history.

(56) References Cited

U.S. PATENT DOCUMENTS

| | | | |
|---|---|---|---|
| 5,610,970 A | 3/1997 | Fuller et al. | |
| 5,752,191 A | 5/1998 | Fuller et al. | |
| 5,758,079 A | 5/1998 | Ludwig et al. | |
| 5,828,731 A | 10/1998 | Szlam et al. | |
| 5,930,700 A * | 7/1999 | Pepper et al. | H04Q 7/24 455/414 |
| 5,970,388 A | 10/1999 | Will | |
| 6,119,022 A | 9/2000 | Osborn et al. | |
| 6,327,628 B1 | 12/2001 | Anuff et al. | |
| 6,359,982 B1 | 3/2002 | Szlam | |
| 6,463,462 B1 | 10/2002 | Smith et al. | |
| 6,577,859 B1 | 6/2003 | Zahavi et al. | |
| 6,636,888 B1 | 10/2003 | Bookspan et al. | |
| 6,665,534 B1 | 12/2003 | Conklin et al. | |
| 6,788,766 B2 | 9/2004 | Logan | |
| 6,801,793 B1 | 10/2004 | Aarnio et al. | |
| 6,816,578 B1 | 11/2004 | Kredo et al. | |
| 6,819,757 B1 | 11/2004 | Cook et al. | |
| 6,819,945 B1 | 11/2004 | Chow et al. | |
| 6,978,136 B2 | 12/2005 | Jenniges et al. | |
| 7,010,288 B2 | 3/2006 | Brown et al. | |
| 7,010,332 B1 | 3/2006 | Irvin et al. | |
| 7,027,842 B2 | 4/2006 | Zhang et al. | |
| 7,043,261 B2 | 5/2006 | Krishnan | |
| 7,072,452 B1 | 7/2006 | Roberts et al. | |
| 7,085,253 B2 | 8/2006 | Yang | |
| 7,107,010 B2 | 9/2006 | Heinonen et al. | |
| 7,110,963 B2 | 9/2006 | Negreiro | |
| 7,111,044 B2 | 9/2006 | Lee | |
| 7,116,976 B2 | 10/2006 | Thomas et al. | |
| 7,188,073 B1 | 3/2007 | Tam et al. | |
| 7,224,775 B1 | 5/2007 | Shaffer et al. | |
| 7,317,706 B1 | 1/2008 | Hao et al. | |
| 7,346,630 B2 | 3/2008 | Eichstaedt et al. | |
| 7,376,434 B2 | 5/2008 | Thomas et al. | |
| 7,376,630 B2 | 5/2008 | Blair et al. | |
| 7,403,972 B1 | 7/2008 | Lau et al. | |
| 7,686,693 B2 | 3/2010 | Danieli et al. | |
| 7,729,688 B2 | 6/2010 | Cheung et al. | |
| 7,792,552 B2 | 9/2010 | Thomas et al. | |
| 7,890,128 B1 | 2/2011 | Thomas et al. | |
| 8,112,104 B1 | 2/2012 | Thomas et al. | |
| 8,280,419 B1 | 10/2012 | Thomas et al. | |
| 8,353,773 B2 | 1/2013 | Sasaki et al. | |
| 8,429,231 B2 | 4/2013 | Wu et al. | |
| 8,391,459 B2 * | 5/2013 | Jasckson et al. | G06Q 10/109 379/210.01 |
| 8,737,978 B1 | 5/2014 | Thomas et al. | |
| 8,744,407 B2 | 6/2014 | Cheung et al. | |
| 8,827,811 B2 | 9/2014 | Kim et al. | |
| 9,204,268 B2 | 12/2015 | Cheung et al. | |
| 9,555,334 B2 | 1/2017 | Bernard et al. | |
| 9,736,664 B2 | 8/2017 | Cheung et al. | |
| 10,142,810 B2 | 11/2018 | Cheung et al. | |
| 10,183,219 B2 | 1/2019 | Linden et al. | |
| 10,207,191 B2 | 2/2019 | Jensen | |
| 2001/0011014 A1 | 8/2001 | Higuchi et al. | |
| 2001/0014611 A1 | 8/2001 | Dufort | |
| 2001/0028709 A1 | 10/2001 | Makela et al. | |
| 2001/0031633 A1 | 10/2001 | Tuomela et al. | |
| 2002/0067806 A1 | 6/2002 | Rodriguez et al. | |
| 2002/0073207 A1 | 6/2002 | Widger et al. | |
| 2002/0094067 A1 | 7/2002 | August | |
| 2002/0142756 A1 | 10/2002 | Rutledge et al. | |
| 2002/0181672 A1 | 12/2002 | Cannell et al. | |
| 2003/0039339 A1 | 2/2003 | Luehrig et al. | |
| 2003/0041048 A1 | 2/2003 | Balasuriya | |
| 2003/0065779 A1 | 4/2003 | Malik | |
| 2003/0103600 A1 | 6/2003 | Potter | |
| 2003/0105854 A1 | 6/2003 | Thorsteinsson et al. | |
| 2003/0112948 A1 | 6/2003 | Brown et al. | |
| 2003/0129968 A1 | 7/2003 | Earl | |
| 2003/0191676 A1 | 10/2003 | Templeton | |
| 2003/0191814 A1 | 10/2003 | Tran | |
| 2003/0232629 A1 | 12/2003 | Jang et al. | |
| 2004/0024882 A1 | 2/2004 | Austin et al. | |
| 2004/0072585 A1 | 4/2004 | Le et al. | |
| 2004/0078340 A1 * | 4/2004 | Evans | G06Q 20/10 705/64 |
| 2004/0122979 A1 | 6/2004 | Kirkland | |
| 2004/0143667 A1 * | 7/2004 | Jerome | G06F 17/30882 709/228 |
| 2004/0203919 A1 | 10/2004 | Ross et al. | |
| 2004/0240650 A1 | 12/2004 | Bear et al. | |
| 2004/0248596 A1 | 12/2004 | Panchal | |
| 2005/0020288 A1 | 1/2005 | Davis | |
| 2005/0027385 A1 | 2/2005 | Yueh | |
| 2005/0037785 A1 | 2/2005 | Chen | |
| 2005/0038690 A1 | 2/2005 | Hayes-Roth | |
| 2005/0071253 A1 | 3/2005 | Yang | |
| 2005/0107130 A1 | 5/2005 | Peterson, II | |
| 2005/0136955 A1 | 6/2005 | Mumick et al. | |
| 2005/0191994 A1 | 9/2005 | May et al. | |
| 2005/0192061 A1 | 9/2005 | May et al. | |
| 2005/0273327 A1 | 12/2005 | Krishnan | |
| 2006/0003803 A1 | 1/2006 | Thomas et al. | |
| 2006/0075038 A1 | 4/2006 | Mason et al. | |
| 2006/0168054 A1 * | 7/2006 | Burkhart | H04L 51/04 709/206 |
| 2006/0212561 A1 * | 9/2006 | Feng | H04L 63/0227 709/223 |
| 2006/0239419 A1 | 10/2006 | Joseph et al. | |
| 2006/0259565 A1 | 11/2006 | Cheung et al. | |
| 2006/0276210 A1 | 12/2006 | Thomas et al. | |
| 2006/0288099 A1 | 12/2006 | Jefferson et al. | |
| 2007/0005368 A1 | 1/2007 | Chutorash et al. | |
| 2007/0047522 A1 | 3/2007 | Jefferson et al. | |
| 2007/0238474 A1 | 10/2007 | Ballas | |
| 2008/0261636 A1 | 10/2008 | Lau et al. | |
| 2010/0114958 A1 | 5/2010 | Korenshtein | |
| 2010/0205272 A1 | 8/2010 | Cheung et al. | |
| 2011/0151582 A1 | 6/2011 | Basile | |
| 2011/0151852 A1 | 6/2011 | Olincy et al. | |
| 2014/0242956 A1 | 8/2014 | Cheung et al. | |

(56) References Cited

U.S. PATENT DOCUMENTS

| | | |
|---|---|---|
| 2014/0256293 A1 | 9/2014 | Thomas et al. |
| 2016/0044474 A1 | 2/2016 | Cheung et al. |
| 2017/0201872 A1 | 7/2017 | Cheung et al. |

OTHER PUBLICATIONS

Notice of Allowance for U.S. Appl. No. 12/798,995 dated Jan. 3, 2012.
Notice of Allowance for U.S. Appl. No. 12,798,995, dated May 9, 2012.
Notice of Allowance for U.S. Appl. No. 12/798,995, dated Oct. 3, 2012.
Notice of Allowance for U.S. Appl. No. 12/798,995, dated Jul. 16, 2013.
Notice of Allowance for U.S. Appl. No. 12/798,995, dated Oct. 30, 2013.
Notice of Allowance for U.S. Appl. No. 12/798,995, dated Feb. 20, 2014.
Office Action for U.S. Appl. No. 14/272,632, dated Jul. 27, 2015.
Notice of Allowance for U.S. Appl. No. 14/272,632, dated Sep. 18, 2015.
Office Action for U.S. Appl. No. 14/922,344, dated Apr. 27, 2016.
Office Action for U.S. Appl. No. 14/922,344, dated Oct. 7, 2016.
Notice of Allowance for U.S. Appl. No. 14/922,344, dated Feb. 14, 2017.
Notice of Allowance for U.S. Appl. No. 14/922,344, dated Mar. 6, 2017.
Notice of Allowance for U.S. Appl. No. 15/469,440, dated Sep. 6, 2017.
First Office Action for CN Patent Application No. 200680027964.9, dated Mar. 26, 2010 (17 pages).
Second Office Action for CN Patent Application No. 200680027964.9, dated Oct. 25, 2010 (14 pages).
Third Office Action for CN Patent Application No. 200680027964.9, dated Apr. 8, 2011 (11 pages).
Notice of Rejection for CN Patent Application No. 200680027964.9, dated Jan. 6, 2012 (11 pgs.).
"Company Overview", http://www.fastmobile.com/company_overview.html, downloaded Nov. 5, 2003, p. 1.
"Introducing the Tellme Voice Application Network", Tellme, http://www.tellme.com/products/, downloaded Oct. 2, 2003, p. 1.
"Iotum History," Iotum Corp., http://iotum.com/simplyrelevant/2006/04/03/iotum-history/, downloaded May 15, 2006, pp. 1-4.
"Messaging", Vodafone Group, 2001, http:www.vodafone.co.nz/business/10.2.3_messaging.jsp, downloaded Oct. 14, 2003, pp. 1-2.
"Microsoft Windows Messenger: Go Beyond Text with Voice & Video Chats", Dell Inc., http://www.dell.com/us/en/dhs/topics/segtopic_002_xp_im.htm, downloaded Oct. 2, 2003, pp. 1-2.
"Microsoft Windows Messenger: Instantly Communicate with Family and Friends Messenger", Dell Inc., http://www.dell.com/us/en/dhs/topics/segtopic_001_xp_im.htm, downloaded Oct. 2, 2003, pp. 1-3.
"Our Solution," Iotum Corp., http://www.iotum.com/our_solution.php, downloaded May 15, 2006, pp. 1-2.
Short Message Service/Interactive Voice Response (SMS/IVR), Lucent Technologies, 2003, pp. 1-2.
"Text messaging", Vodafone Group, 2001, Vodafone—Services, "All about text messaging", http://www.vodafone.co.nz/services/07.a.1_two_way_messaging.jsp?hd=4yourbusiness& . . . , downloaded Oct. 14, 2003, pp. 1-2.
"We bring relevance to communications," Cnet News, Ina Fried, Jul. 21, 2005, pp. 1-2.
Appenzeller, et al., "The Mobile People Architecture", Technical Report: CSL-TR-00000, Computer Systems Laboratory, Departments of Electrical Engineering and Computer Science, Stanford University, Jan. 1999, pp. 1-13.
BlackBerry, "Voice and SMS", http://www.blackberry.com/products/service/voices_sms.shtml?DCPID=hmsvoice downloaded Oct. 2, 2003, p. 1.
Calsyn, Martin and Desseault, Lisa, "Presence Information Protocol Requirements," Internet Draft, Feb. 9, 1998, pp. 1-27.
Emergin Inc., "Emergin WirelessOffice 5.0", http://www.emergin.com/?source=overture, downloaded Oct. 2, 2003, p. 1.
Fastmobile Inc., "Dialog GSM launches Push 'n' Talk walkie talkie service Push to Talk over Cellular Now in Sri Lanka Dialog GSM Pioneers Latest GSM Advancement", Press Release, Dec. 1, 2004, pp. 1-2.
Fastmobile, "fastmobile's fastchat™ Instant Communications Application is Coming to Thousands of Mobile Phone Retail Stores Nationwide", fastmobile Press Release, Sep. 15, 2003, pp. 1-3.
IMBOT, Press Release, "IMBOT offers new Text 2 Voice Service Text 2 Voice service enables wireless customers to send voice messages from 2-Way devices", Oct. 29, 2001, pp. 1-2.
Internet Traveler, "Welcome to the Inter.Net Communicator Tour!", http://www.inter.net/traveler/tour/communicator_messaging.php, downloaded Oct. 14, 2003, p. 1.
J. Rosenberg, H. Schulzrinne, Internet Draft, "SIP for Presence," http://www.alternic.org/drafts/drafts-r-s/draft-rosenberg=sip-pip-00.txt, Nov. 13, 1998, Bell Laboratories, Columbia, pp. 1-31.
Joseph, Anthony D. et al., "The Case for Services over Cascaded Networks", EECS Department, CS Division, University of California, Berkeley, http://iceberg.cs.berkeley.edu/, International Conference on Wireless and Mobile Multimedia 1998, pp. 1-9.
MobileShop, "SMS—also know as text messaging", http://www.mobileshop.org/howitworks.sms.htm, downloaded Oct. 14, 2003, pp. 1-2.
Schulzrinne, H. et al., RPID: Rich Presence Extensions to the Presence Information Data Format (PIDF), draft-ietf=simple-rpid-06.txt, Jun. 2, 2005, http://www1.ietf.org/mail-archive/web/simple/current/msg05398.html, downloaded Nov. 15, 2006, pp. 1-35.
Schulzrinne, H. et al., RPID: Rich Presence Extensions to the Presence Information Data Format (PIDF), draft-ietf-simple-rpid-10.txt, Dec. 20, 2005, pp. 1-41.
Schulzrinne, H. et al., RPID: Rich Presence Extensions to the Presence Information Data Format (PIDF), draft-ietf-simple-rpid-10.txt, Dec. 4, 2005, pp. 1-35.
Sonim Technologies, Inc., "Integrated voice and text messanging over GPRS showcased jointly by Sonim, Symbian and Texas Instruments", Sonim Press Release, Dec. 2, 2002, pp. 1-2.
Symbian Ltd., "Symbian OS Version 7.0: Functional description", Revision 1.5, Feb. 2003, pp. 1-24.
Symbian Ltd., "Symbian OS Version 7.0s: Functional description", Revision 2.1, Jun. 2003, pp. 1-29.
Symbian Ltd., "Technology: Creating Symbian OS phones", http://www.symbian.com/technology/create-symb-OS-phones.html, downloaded Nov. 5, 2003, p. 1-8.
Symbian Ltd., "Technology: Why is a different operating system needed", http://www.symbian.com/technology/why-diff-os.html, downloaded Nov. 5, 2003, pp. 1-5.
Verizon Wireless, "TXT messaging", http://www.vtext.com/customer_site/jsp/messaging_lo.jsp, downloaded Oct. 2, 2003, p. 1.
W3C, Voice Extensible Markup Language (VoiceXML) Version 2.0, W3C, www.w3.org, Feb. 20, 2003.
Yahoo!Messenger, "Yahoo!Messenger Talk for Free!", http://messenger.yahoo.com/messenger/help/voicechat.html, downloaded Oct. 2, 2003, pp. 1-2.
Notice of Allowance for U.S. Patent Application No. 15/469,440, dated Dec. 19, 2017.
Notice of Allowance for U.S. Appl. No. 15/469,440, dated Sep. 27, 2018.
Notice of Allowance for U.S. Appl. No. 15/469,440, dated Aug. 8, 2018.
Bulk, F. "Final Project: Skype," http://www1.cs.columbia.edu/~salman/skype/frank.pdf, May 5, 2004, pp. 23.
Using AIM on Windows — Video IM, https://web.archive.org/web/20050307231707/http:/www.aim.com/help_faq/using/win/video_im.adp?aolp=, downloaded Aug. 9, 2019, 2 pgs.
Download AIM for Windows, https://web.archive.org/web/20050204020358/http:/channels.netscape.com/wrap/linker.jsp?floc=

(56) References Cited

OTHER PUBLICATIONS at_oswin_1_12&ref=http://www.aim.com/get_aim/win/latest_win.adp?aolp=#whatsnew, downloaded Aug. 9, 2019, 2 pgs.

Using AIM on Windows—Mar. 8, 2005, https://web.archive.org/web/20050308012857/http://www.aim.com/help_faq/using/win/aimtalk.adp?aolp=, downloaded Aug. 9, 2019, 2 pgs.

AIM Buddy List, https://web.archive.org/web/20050531083304/http://www.aim.com/help_faq/starting_out/buddylist.adp?aolp=, downloaded Aug. 9, 2019, 1 pg.

AIM Registration, https://web.archive.org/web/20041216085601/http:/wvvw.aim.com:80/help_faq/starting_out/registration.adp?aolp=, downloaded Aug. 9, 2019, 2 pgs.

Using AIM on Windows — Mar. 5, 2005, https://web.archive.org/web/20050305095328/http:/www.aim.com:80/help_faq/using/win/instant_message.adp?aolp=, downloaded Aug. 9, 2019, 2 pgs.

AIM® Inside the Sidekick, https://web.archive.org/web/20050519114310/http:/mymobile.aol.com/portal/im/pdfs/tmobile/AIM_SIDEKICK_UG_tmobile.pdf, copyright 2002 by America Online, Inc., 13 pgs.

MSN Messenger:mac, https://web.archive.org/web/20050604080622/http://www.microsoft.com/mac/default.aspx?pid=msnmessenger, downloaded Aug. 9, 2019, 2 pgs.

MSN Messenger, "Communicate with MSN® Messenger," https://web.archive.org/web/20051013055708/http://www.imagine-msn.com/messenger/post/communicate/instantmessage.aspx, downloaded Aug. 9, 2019, 2 pgs.

MSN Messenger, "Download MSN Messenger," https://web.archive.org/web/20050601002632/http://messenger.msn.com/download/, downloaded Aug. 9, 2019, 1 pg.

MSN Messenger, "Most Frequently Asked Questions," https://web.archive.org/web/20050601014205/http://messenger.msn.com/Help/, downloaded Aug. 9, 2019, 8 pgs.

Skype TM, "Skype is free Internet telephony that just works," https://web.archive.org/web/20050601003206/http://www.skype.com/, downloaded Aug. 9, 2019, 21 pgs.

Skype TM, "How to Use Skype," https://web.archive.org/web/20041229163311/http:/www.skype.com/help/guides/usingskype.html, downloaded Aug. 9, 2019, 6 pgs.

Skype TM, "How to Add a Contact — User Guide," https://web.archive.org/web/20041230160101/http:/www.skype.com/help/guides/adduser.html, 10 pgs.

Skype TM, "Registering a Skype Name — User Guide," https://web.archive.org/web/20041229042631/http:/www.skype.com/help/guides/registration.html, 10 pgs.

"Yahoo! Messenger," https://web.archive.org/web/20050601042101/http://messenger.yahoo.com/newtoim.php, downloaded Aug. 9, 2019, 3 pgs.

"Yahoo! Help — All-New Messenger 6.0," https://web.archive.org/web/20040806142252/http://help.yahoo.com/help/us/messenger/wintabuse/abuse-02.html, downloaded Aug. 9, 2019, 2 pgs.

"AOL 8 Instant Messenger TM," https://web.archive.org/web/20050601001345/http:/www.aim.com/, downloaded Aug. 6, 2019, 2 pgs.

MSN Messenger Version 7.0, "Messenger," https://web.archive.org/web/20050601023444/http:/messenger.msn.com . . ., downloaded Aug. 6, 2019, 2 pgs.

Skype TM, "Skype is free Internet telephony that just works," https://web.archive.org/web/20050601003206/http:/www.skype.com, downloaded Aug. 6, 2019, 3 pgs.

"Yahoo! Messenger," https://web.archive.org/web/20050601012258/http:/messenger.yahoo.com, downloaded Aug. 6, 2019, 1 pg.

* cited by examiner

| ICM | | Default |
|---|---|---|
| 1 | Mobile phone | Voice mail |
| 2 | Office phone | Voice mail |
| 3 | Home phone | Voice mail |
| 4 | Mobile SMS/pager from mobile phone or PDA | Email |
| 5 | Home/office SMS (to office/home PC) | Email |
| 6 | Mobile Online chat (to mobile phone or PDA) | Voice mail |
| 7 | Home Online chat (Net Meeting, AOL, ICQ etc.) | Voice mail |
| 8 | Voice mail with instant notification to mobile devices of the user | |
| 9 | Voice mail without notification to mobile devices | |
| 10 | Office fax | |
| 11 | Home fax | Reject |
| 12 | Mobile Email (Blackberry etc.) | Email |
| 13 | Email | Reject |
| 14 | User defined | |

FIGURE 1

| ContactClass1 | Kinship family members, love ones |
|---|---|
| ContactClass2 | Relatives and friends |
| ContactClass3 | Boss and VIP |
| ContactClass4 | Colleagues |
| ContactClass5 | Subordinates |
| ContactClass6 | Business acquaintances |
| ContactClass7 | VIP Clients |
| ContactClass8 | Clients |
| ContactClass9 | Secretary |
| ContactClass10 | User defined |

FIGURE 2

| UrgClass1 | Life threatening – interrupt at any time and occasion |
|---|---|
| UrgClass2 | Urgent confirmed meeting reminder – interruption allowed |
| UrgClass3 | Urgent matter requiring immediate attention |
| UrgClass4 | Important matter requiring quick attention |
| UrgClass5 | Regular work related matter |
| UrgClass6 | Casual contact |
| UrgClass7 | Cold calls from unknown person |
| UrgClass8 | User defined |

FIGURE 3

| MyBusyState1 | Important meeting |
|---|---|
| MyBusyState2 | Ordinary meeting |
| MyBusyState3 | Available |
| MyBusyState4 | Sleeping |
| MyBusyState5 | Resting |
| MyBusyState6 | User defined |

FIGURE 4

| ContactClass | UrgClass | MyBusyState | ICM allowed |
|---|---|---|---|
| ContactClass2 | UrgClass1-3 | All | All |
| | UrgClass4-6 | MyBusyState1 | All |
| | | MyBusyState2-3 | All |
| | | MyBusyState4-5 | All |
| | UrgClass7-8 | All | ICM 13 |

FIGURE 5

METHOD AND APPARATUS TO MANAGE MESSAGING PROVIDING DIFFERENT COMMUNICATION MODES DEPENDING ON ONE IDENTIFIER AND NOT REQUIRING TO DISCLOSE CONTACT INFORMATION

CROSS-REFERENCE TO RELATED APPLICATIONS

This application is a continuation of U.S. patent application Ser. No. 15/469,440, filed Mar. 24, 2017, and entitled "A NETWORK-BASED PORTAL TO MANAGE COMMUNICATION,", which is hereby incorporated herein by reference, which application is a continuation of U.S. patent application Ser. No. 14/922,344, filed Oct. 26, 2015, now U.S. Pat. No. 9,736,664, and entitled "SYSTEMS AND PROCESSES TO MANAGE MULTIPLE MODES OF COMMUNICATION," which is hereby incorporated herein by reference, which application is a continuation of U.S. patent application Ser. No. 14/272,632, filed May 8, 2014, now U.S. Pat. No. 9,204,268, and entitled "SYSTEMS AND PROCESSES TO MANAGE MULTIPLE MODES OF COMMUNICATION," which is hereby incorporated herein by reference, which application is a continuation of U.S. patent application Ser. No. 12/798,995, filed Apr. 14, 2010, now U.S. Pat. No. 8,744,407, and entitled "SYSTEMS AND PROCESSES TO MANAGE MULTIPLE MODES OF COMMUNICATION," which is hereby incorporated herein by reference, which application is a continuation of U.S. patent application Ser. No. 11/452,115, filed Jun. 12, 2006, now U.S. Pat. No. 7,729,688, and entitled "SYSTEMS AND PROCESSES TO MANAGE MULTIPLE MODES OF COMMUNICATION", which is hereby incorporated herein by reference, which application is a continuation-in-part application of U.S. patent application Ser. No. 11/006,343, filed Dec. 7, 2004, now U.S. Pat. No. 7,116,976, and entitled "ADAPTABLE COMMUNICATION TECHNIQUES FOR ELECTRONIC DEVICES," which is hereby incorporated herein by reference, which claims priority to U.S. Provisional Patent Application No. 60/527,565, filed Dec. 8, 2003, entitled "ADAPTABLE COMMUNICATION TECHNIQUES FOR ELECTRONIC DEVICES," and which is hereby incorporated herein by reference.

This application, by way of U.S. patent application Ser. No. 11/452,115, also claims priority to U.S. Provisional Patent Application No. 60/689,686, filed Jun. 10, 2005, entitled "SYSTEMS AND PROCESSES TO MANAGE MULTIPLE MODES OF COMMUNICATION," and which is hereby incorporated herein by reference.

BACKGROUND OF THE INVENTION

For many years, other than mails from post offices, we typically only received information from afar through telephones. However, in the past few years, ways that others can send us information have increased significantly. Just to list a few different modes of communication, we can be reached from standard desk phones, fax, cell phones, electronic mails, and instant messages. In addition, we can have more than one phone number and multiple electronic mail addresses. There are people we like to communicate with, and there are those we prefer to avoid. Managing information from all such different modes can be quite time consuming.

It should be apparent from the foregoing that there is still a need to help manage the numerous modes of communication.

SUMMARY OF THE INVENTION

Different embodiments of a computer-implemented system and method to manage the communication of a user are disclosed. In one embodiment, an apparatus, using at least a network-based portal based on Internet protocol, could provide a number of communication options to a first user, with messages eligible to be received via an electronic device associated with a second user based on any of the options depending on an identifier associated with the second user, the options including text messaging and voice communication; could receive an indication from the first user via an electronic device associated with the first user, indicating the selection of a communication option for a message for the second user; could permit the second user to block the first user from accessing the second user; and could determine availability of the second user to receive the message. In the embodiment, the apparatus could require contact information associated with the second user to allow the second user to receive messages via the network-based portal, with the contact information associated with the second user not provided to the first user via the electronic device associated with the first user, even when the message is received by the second user via the electronic device associated with the second user, and with the contact information associated with the second user being distinct from the identifier associated with the second user.

A person tries to electronically convey a message to the user. In one embodiment, the status of the user is identified; the identity of the person is identified; the urgency of the message is identified; the access priority of the person is determined based on the person's identity; and a process is set to manage the message using one or more rules, and in view of the status of the user, the access priority of the person and the urgency of the message.

Based on different embodiments, the status of the user depends on the current activity or location of the user, or the current time. The status of the user can also be defined by the user. Similarly, the access priority of the person can be defined by the user, or is set depending on the user's reaction towards a prior message from the person. Also, the urgency of the message is set by the person.

The process can depend on the mode of communication of the message. For example, the mode of communication can include a mobile phone, an office phone, a home phone, a mobile SMS, a pager from a mobile phone or PDA, a home/office SMS, mobile online chat, home online chat, a voice mail with/without instant notification, an office fax, a home fax, a mobile email, and an email.

In one embodiment, the user receives the message through a handheld device, such as a cellular phone. In another embodiment, the message is electronically conveyed based on Internet protocol through a website.

In one embodiment, though the process allows the user to receive the message, the person is not aware of the contact information of the user. For example, the person is not aware of the phone number of the cellular phone that the user used to talk to the person. This prevents the person from directly accessing the user without going through an intermediate control, such as a website. Similarly, the user does not have to be aware of the contact information of the person.

In another embodiment, the defined access priority of the person is stored at a website, allowing the website to access such information without asking for the user's permission. In one embodiment, the defined access priority is stored in a private database under the user's control.

In one embodiment, text messages could be received in an audio manner, and audio messages could be sent as text messages.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 1 shows a number of intelligent communication modes according to one embodiment of the invention.

FIG. 2 shows a number of contact classes according to one embodiment of the invention.

FIG. 3 shows a number of urgency classes according to one embodiment of the invention.

FIG. 4 shows a number of statuses of a user according to one embodiment of the invention.

FIG. 5 shows one embodiment of an example of an Access Priority Database according to one embodiment of the invention.

Figure 6:
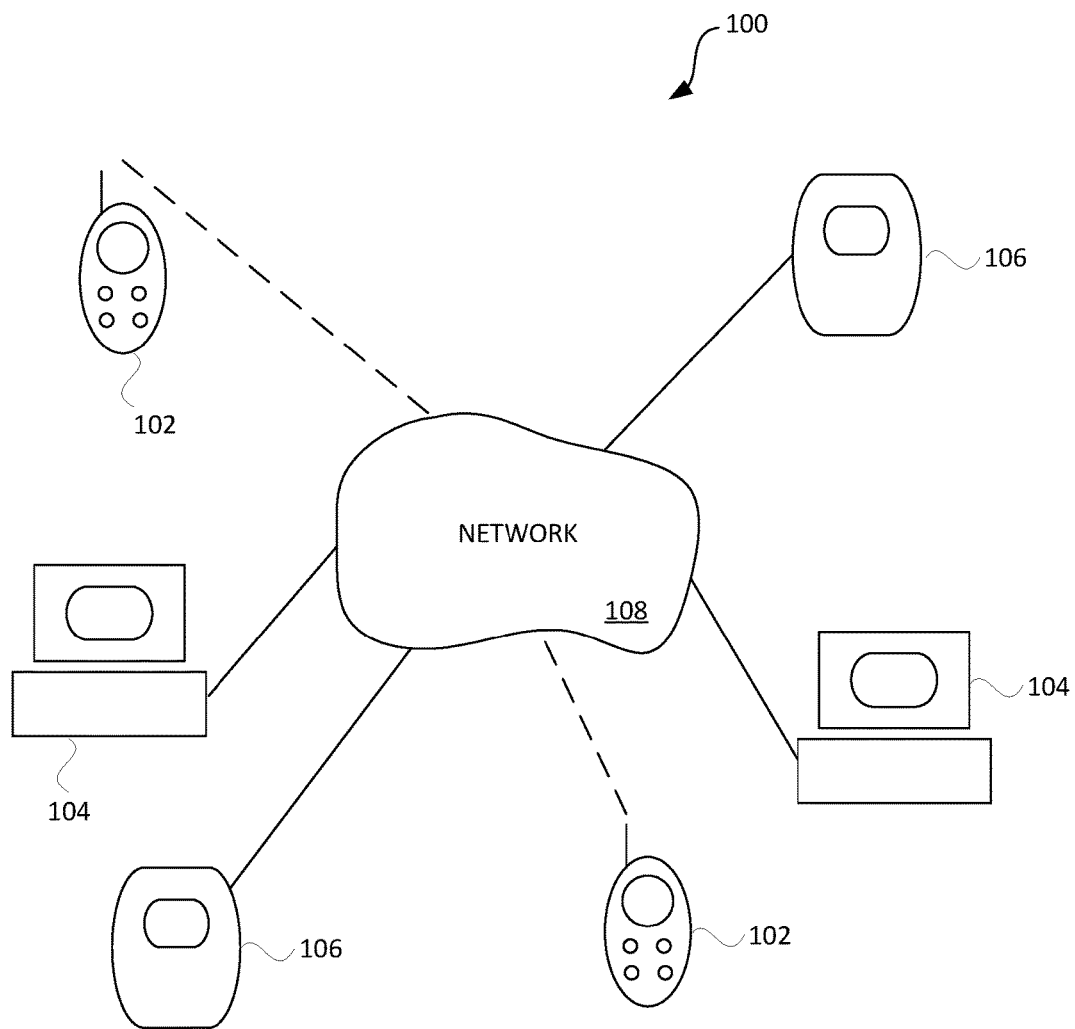
FIG. 6 is a communication system according to one embodiment of the invention.

Same numerals in FIGS. 1-12 are assigned to similar elements in all the figures. Embodiments of the invention are discussed below with reference to FIGS. 1-12. However, those skilled in the art will readily appreciate that the detailed description given herein with respect to these figures is for explanatory purposes as the invention extends beyond these limited embodiments.

DETAILED DESCRIPTION OF THE INVENTION

One embodiment of the invention can automatically remove unwanted communications. Certain communications are relatively easy to determine to be unwanted, such as marketing cold calls and wrong number calls. Other communications may be more difficult. They can depend not just on the sources of the communication, but also the conditions or status of the receiver (a user) of the communication. The status can be related to the user's current activity and/or location. For example, when the user is on a train going to work, the user probably does not mind chatting with his grandchild. However, if the user is having his yearly review meeting with his boss, the user probably would prefer to avoid the call from his grandchild, unless it is an emergency. Based on the embodiment, communications from sources the user wants to postpone receiving can be automatically diverted.

In one embodiment, the user can get appropriate notification on the source of the incoming communication request. The attributes of the notification can depend on the urgency of the communication and/or the status of the user.

The user may receive information from different modes of communication. For example, the user can have mobile phones, fixed lines at home or office, emails, SMS, and faxes, with their different numbers and/or addresses. One embodiment can help the user efficiently manage information from the different modes. The user only has to remember one specific address from one mode of communication. Through that address, the user can receive communications from all modes of communication, independent of where the user is, or the type of hardware the user has. This allows the user to efficiently maintain his communication from the numerous modes even when he is traveling. For example, the user does not have to change phones (and the phone numbers) when he moves from areas covering 3G to areas that do not.

A number of embodiments depend on the different modes of communication converging onto the internet protocol platform. A communication gateway or a portal is formed allowing the user to receive communications from numerous sources through different modes. This, in turn, could reduce the numerous addresses the user has to remember, to one address. For example, an e-mail address for the user can serve as an access identifier for the different communication addresses from different communication modes. The access identifier can become the user's digital identity. In one embodiment, the user's other types of identification, such as the user's driver licenser number, can be the user's access identifier.

One embodiment of the invention uses an open portal based on the web. Based on the portal, the user can securely determine who can reach him at what conditions. This can be done based on a status indicator. As an example, this indicator is determined according to the status of the user, the access priorities of the person trying to reach the user (or the relationship or the lack of relationship between the user and the person), and/or the urgency of the message from the person. The status of the user can be dynamically determined, based on the current condition(s) of the user. The portal can allow the user and the person to select different options, which can be modified as desired. For example, the relationship can be preset by the user and stored in a database, while the urgency of the message can be set by the person.

Thus, in one embodiment, the portal can be used to control the selection and setting of different intelligent communication modes for the user. These intelligent communication modes allow priorities of various kinds of communication options to be set by the user. The portal allows worldwide access to the user, and can dynamically determine, for example, whether a call initiated at different time by different callers should be accepted by the user in real-time or handled by other mechanisms. From this information, communication requests can be classified, for example, into different degrees of undesirability. Some requests can be automatically blocked from the user. Others can be diverted and handled by other mechanism, such as diverting a phone call to an email or voice mail.

In one embodiment, the portal or gateway also includes a database to keep track of the user's different contacts or acquaintances, and the access priorities of each contact. The user can modify information in the database, such as assigning and/or changing the priorities of the contacts. Based on the information (or lack of information) in the database of the contact trying to access the user, and based on the status of the user, the gateway can automatically select an intelligent mode of communication for the user. This selection can be done dynamically.

In one embodiment, the portal can dynamically change the access priorities of a caller trying to reach the user. For example, previously the caller is of high priority to the user, and the user has set her access priorities accordingly. Lately, every time the caller trying to reach the user, the request was denied. After a preset number of rejections, the portal can automatically send a message to the user, asking the user if the user would like to lower the access priority of the caller. If the response is affirmative, the caller's priority is automatically reduced.

In another embodiment, the user does not have to set priorities of each contact. The system monitors every call, and provides the contact's identity to the user. Based on the user's reaction to the call (e.g. accepting or rejecting it), the system automatically sets the contact's priorities. In one embodiment, the system can then query the user for approval on the setting, and allow the user to adjust it as necessary. In another embodiment, the system can continue to modify the caller's priorities based on the user's reaction to the caller's subsequent calls.

In one embodiment, the user could keep information he believes to be sensitive local in a different database. Such information can be stored securely under the user's direct control. The portal can retrieve information from the different database when required. In another embodiment, the user can restrict or limit such retrieval process.

Additional confidentiality can be provided. In one embodiment, using phone calls as an example, the user can be aware of the identity of the caller even without being informed of the number of the caller. Similarly, the caller can reach the user without being aware of the number of the phone the user is using to receive the call. The user can keep his location and/or status confidential but still can receive the communication. This can be useful because there are situations, for example, when the user does not want to disclose his contact information but the user needs to receive services provided by the caller.

One approach to maintain such confidentiality while maintaining real-time communication is based on a system that digitally identifies the identities of the caller and the receiver. Note that the term caller is used in general. It is not just limited to phone calls, but they can be any person or entity requesting to communicate with the user, such as trying to send a message to the user. As a separate note, the caller can also be a user of different embodiments of the invention.

After determining the identities, the system can establish connections between the caller and the user in real time. Though contacts are established, the system only needs to ensure the identities of the caller and the user to each other. However, the system does not have to disclose the phone numbers, electronic addresses, physical locations and/or other attributes of the caller and the user to each other. In one embodiment, real time implies that the time required for the identification is similar to the typical time required to set up, for example, a telephone call. The system can be a portal based on the web.

In one embodiment, a portal also holds the user's electronic calendar. The calendar can be programmable, with entries set by the user. The portal can automatically and securely set appointments for the user since the portal knows the identity of the caller, and the status and schedule of the user. For example, the appointment can be for a conference call.

To illustrate, in one embodiment, a portal provides a number of intelligent communication modes (ICM) for the user to select as shown in FIG. 1. There are three columns in the table. If the communication mode selected in the second column does not work, the portal automatically defaults to the corresponding approach in the third column. For example, under ICM 1, if the mobile phone is busy, default to voice mail. Some of the selections do not have any default because it may not be necessary to default. For example, under ICM 8, the incoming message goes directly to voice mail with instant notification to mobile devices of the user. The incoming message can usually go to voice mail. There is no need to default.

As a receiver of communication, the user can define a number of contact classes, as shown in FIG. 2. The user can set up a number of urgency classes, as shown in FIG. 3. The user can define a number of status, as shown in FIG. 4. Then, based on tables in FIGS. 1-4, the user can set up an Access Priority Database for different ContactClasses, as shown in FIG. 5.

As another example, the user can categorize the following contacts into the corresponding ContactClasses:

| Alice (Wife) | ContactClass1 |
| Peter (Close Friend) | ContactClass2 |
| Colina (Close Friend's wife) | ContactClass2 |

Peter wants to make a mobile phone call to the user. In one embodiment, Peter calls a portal. As an example, the portal can be the user's ISP. The portal first verifies the caller's identity to be Peter. This can be done, for example, by a public key challenge based on Peter having a public key digital certificate. In another example, Peter is also a registered user of the portal. Then, Peter's identity can be more readily identified or verified.

In one embodiment, after verification, a virtual address/number for the communication session is created allowing Peter to reach the user, which can be by phone. The user's phone number does not have to be disclosed to Peter. Similarly, Peter's mobile phone number does not have to be disclosed to the user. The portal can assure the user that the person calling is Peter based on an identification verification process, such as ones described above.

In establishing contact, the portal can access the user's database and determine that Peter belongs to ContactClass2. The database can, for example, be in the portal.

In another embodiment, the database is in a personal communication device of the user. The portal accesses the personal communication device to determine Peter's ContactClass.

Based on the ContactClass information, the status of the user and Peter's urgency setting, the user may receive Peter's call directly. As another example, Peter may be asked to leave a voice mail to the user, while the user is notified by a mobile short message regarding an incoming call from Peter.

As additional examples, in one embodiment, location information of the user could be determined based on GPS information from, for example, the user's cell phone.

In one embodiment, the user receives messages through a handheld device, such as a phone, and the phone has a switch. The switch can be a physical button or a software setting, such as a pull-down menu. The user could set his status dynamically by changing the physical or logical position of the switch. For example, one position can indicate that the user is very busy, and should only be interrupted by an urgent message from the user's closest contacts, such as his wife or parents. Another position can indicate that the user's status allows the user to receive any messages from anyone.

As explained above, based on an embodiment, a message is electronically conveyed by a central network server, such as a web server based on Internet protocol. A portal or gateway approach could provide general Internet access to one or more embodiments of the communication management systems so that users can configure the system behavior they desire. The portal or gateway can then facilitate download of a database or update thereto to a communication device, such as a phone.

Also, as explained above, based on an embodiment, a user could efficiently maintain his communication, and does not even have to change phones when he moves from areas covering 3G to areas that do not. These phones could be based on different communication mechanisms, such as GSM, CDMA, 3G and 4G systems. Also as explained above, the user could keep information in local databases, such as in such a phone. For example, the intelligent communication modes shown in FIG. 1 for the user to select are in the phone. The user could define the contact classes, such as the ones shown in FIG. 2; set up the urgency classes, such as the ones shown in FIG. 3; define the statuses, such as the ones shown in FIG. 4; set up the Access Priority Database, such as the one shown in FIG. 5; and categorize a number of the user's contacts into the corresponding ContactClasses, all in the phone. When a caller places a call to the phone, based on information previously set in the phone and based on the urgency class selected by the caller, the phone could automatically manage the communication. Note that the phone does not have to be a cellular phone. In one embodiment, the phone is a desk top phone.

Again as explained above, the person or the caller trying to contact the user could select different options. For example, the urgency of the message can be set by the caller. This selection is typically in the call setup phase. In one embodiment, the caller has pre-selected the urgency class before making the call. In another embodiment, if the caller has not selected the urgency class, the system could prompt the caller to input an urgency class or status before the call or message is routed to the user. In yet another embodiment, different urgency classes could be defined by the caller.

Different embodiments or implementations may yield different advantages. One advantage is that communications for users of electronic devices can be flexibly provided. Another advantage is that communication mode changes can be performed at an electronic device to better suit the needs or condition of the electronic device or user preferences. In still another advantage, a user can provide feedback to a caller without answering a voice call from the caller.

Another aspect of the invention pertains to improved approaches to respond to an incoming text message. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

Further, the computer-implemented methods and systems discussed above can be used in conjunction with one or more of the various approaches discussed in U.S. patent application Ser. No. 11/006,343. For example, the automated actions or decisions (e.g., intelligent secretary, decision 204 in FIG. 2, etc.) of U.S. patent application Ser. No. 11/006, 343 can be automatically made by the systems/methods described above. Still further, the various approaches discussed in U.S. patent application Ser. No. 11/006,343 can be used in conjunction with one or more the various methods/systems discussed above. For example, the systems/methods described above can use the messaging approaches (e.g., audio or textual messages) described in U.S. patent application Ser. No. 11/006,343.

Different embodiments of the invention pertain to improved approaches for users of electronic devices to communicate with one another. The electronic devices have audio and/or textual output capabilities. The improved approaches can enable users to communicate in different ways depending on device configuration, user preferences, prior history, time or other criteria. In one embodiment, the communication between users is achieved by short audio or textual messages.

The electronic device can be any computing device having communication capabilities. Such computing devices can be referred to as communication devices. Examples of electronic devices include personal computers, personal digital assistants, pagers or mobile telephones.

Embodiments of the invention are discussed below with reference to FIGS. 6-12. However, those skilled in the art will readily appreciate that the detailed description given herein with respect to these figures is for explanatory purposes as the invention extends beyond these limited embodiments.

FIG. 6 is a communication system 100 according to one embodiment of the invention. The communication system 100 can support different communication devices, including mobile telephones 102, computers 104 (e.g., personal computers) and/or wireless personal digital assistants (PDAs) 106. Users of the communication devices 102-106 can communicate with like or different communication devices. Each communication device 102-106 offers one or both of audio or textual communication capabilities. These communication devices 102-106 can inter-communicate with one another through a network 108. The network 108 can include one or more of voice networks and data networks. For example, one network is a data network providing a slow speed data channel for transmission of Short Message Service (SMS) messages (which are typically limited to 160 text characters) to a Short Message Service Center (SMSC) and then forwarded on to the destination. Besides short messages (e.g., SMS messages), the network 108 can also support other messaging protocols for sending and receiving enhanced messages (EMS), multimedia messages (MMS), email and fax messages. Other networks support faster data channels and voice channels, such as GPRS, UMTS, G4, GSM, CDMA and various protocols, such as UDP, TCP, WAP, PDP other protocols.

According to one embodiment of the invention, one of the communication devices 102-106 can send a short message to another of the communication devices 102-106. The short message can be text-based or audio-based. The sending communication device allows its user to create the short message as the user desires and/or as the device permits. For example, the user might interact with a keypad or keyboard to enter the short message, or the user might record audio inputs (e.g., speech) for the short message. The short message can then be sent to the receiving communication device. The sending of the short message may involve converting the short message from an audio message to a text message, or vice versa. Also, the receiving communication device can further convert the short message from audio-to-text or from text-to-audio. In any case, the short message is presented (e.g., displayed or played) to the user of the receiving communication device. The presentation can vary as the user desires or as the device permits.

One aspect of the invention pertains to improved approaches to respond to incoming voice calls. The improved approaches enable a called party (i.e., a party being called) to provide some information to a calling party without directly engaging in a voice call with the calling party. The called party can choose not to take the voice call from the calling party. Instead, the called party can provide the calling party with some limited information. The limited information can be provided in an audio or textual format. In one embodiment, the limited information provides the calling party with feedback as to why the voice call was not taken.

Figure 7:
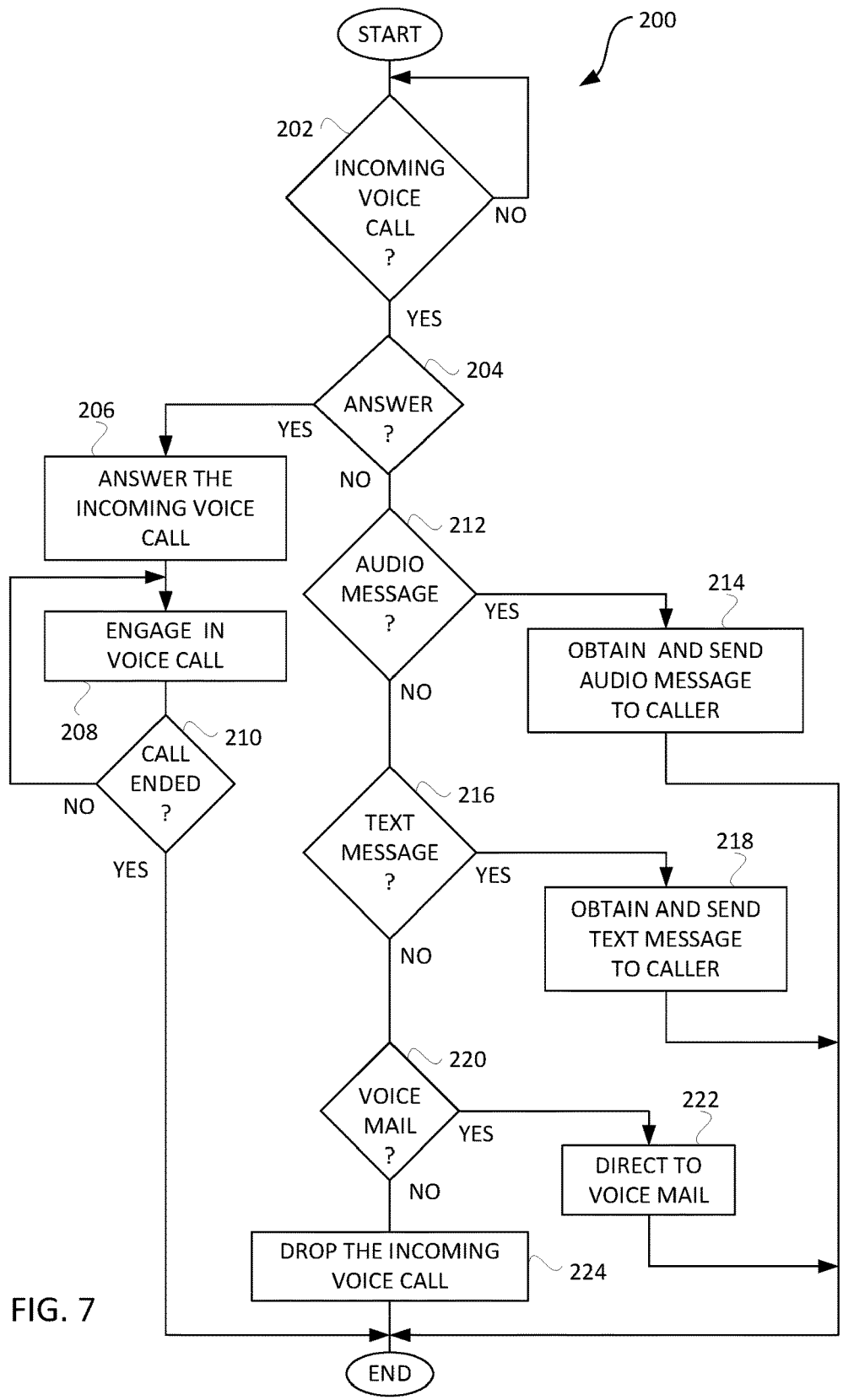
FIG. 7 is a flow diagram of a personal call response process according to one embodiment of the invention.

FIG. 7 is a flow diagram of a personal call response process 200 according to one embodiment of the invention. The personal call response process 200 is performed by an electronic device, such as a mobile communication device (e.g., mobile telephone). The personal call response process 200 begins with a decision 202 that determines whether there is an incoming voice call. When the decision 202 determines that there is no incoming voice call, then the personal call response process 200 awaits such a call. Once the decision 202 determines that there is an incoming voice call, a decision 204 determines whether the incoming voice call is to be answered. Typically, the user of the electronic device would signal the electronic device as to whether or not to answer the incoming voice call. Alternatively, the electronic device could automatically decide whether to answer the call.

When the decision 204 determines that the user desires the incoming voice call to be answered, the incoming voice call is answered 206 and the user engages 208 in a voice call with the calling party. A decision 210 then determines whether the call has ended. When the decision 210 determines that the call has not yet ended, then the personal call response process 200 can return to repeat the block 208 while the voice call continues. Once the decision 210 determines that the voice call has ended, then the personal call response process 200 ends.

When the decision 204 determines that the user does not desire to answer the incoming voice call, a decision 212 determines whether the user desires to provide an audio message to the calling party. When the decision 212 determines that the user does desire to provide an audio message to the calling party, an audio message is obtained and sent 214 to the calling party (caller).

Alternatively, when the decision 212 determines that the user does not desire to provide an audio message, a decision 216 determines whether the user desires to provide a text message to the calling party. When the decision 216 determines that the user desires to provide a text message to the calling party, a text message is obtained and sent 218 to the calling party.

Still further, when the decision 216 determines that the user does not desire to provide a text message to the calling party, a decision 220 determines whether the incoming voice call is to be directed to voice mail. When the decision 220 determines that the incoming voice call should be directed to voice mail, then the incoming voice call is directed 222 to voice mail. On the other hand, when the decision 220 determines that the incoming voice call is not to be directed to voice mail, the incoming voice call is dropped 224. Following the blocks 214, 218, 222 and 224, the personal call response process 200 is complete and ends.

In another embodiment, a personal call response process could announce the calling party to the called party (user). In announcing the calling party, the personal call response process would present the called party with information pertaining to the calling party (e.g., display or audio sound). Such information could, for example, help the called party to decide whether to answer the incoming voice call. The information can, for example, include one or more of name (individual or business), telephone number, or other caller identification. The information could also include status information of the calling party, such as position, health, mood, etc. As an example, the information could be presented to the user prior to the decision 204 of the personal call response process 200 shown in FIG. 7.

In still another embodiment, an automated decision process to decide whether to answer a call can be based on time (e.g., decision 204). For example, the called party can previously set a rule, such as that from midnight to 6 am, the party does not want to answer voice calls. Then, during this time period, the electronic device can automatically decide not to answer incoming calls. In one implementation, when the electronic device decides not to answer incoming calls, no indication of incoming calls will be provided to the called party. For example, from midnight to 6 am, the device would not produce any ring tone. Additionally, if desired, the called party can also configure the electronic device to automatically provide an audio message or a text message to the calling party (e.g., I'm asleep call me tomorrow").

Figure 8:
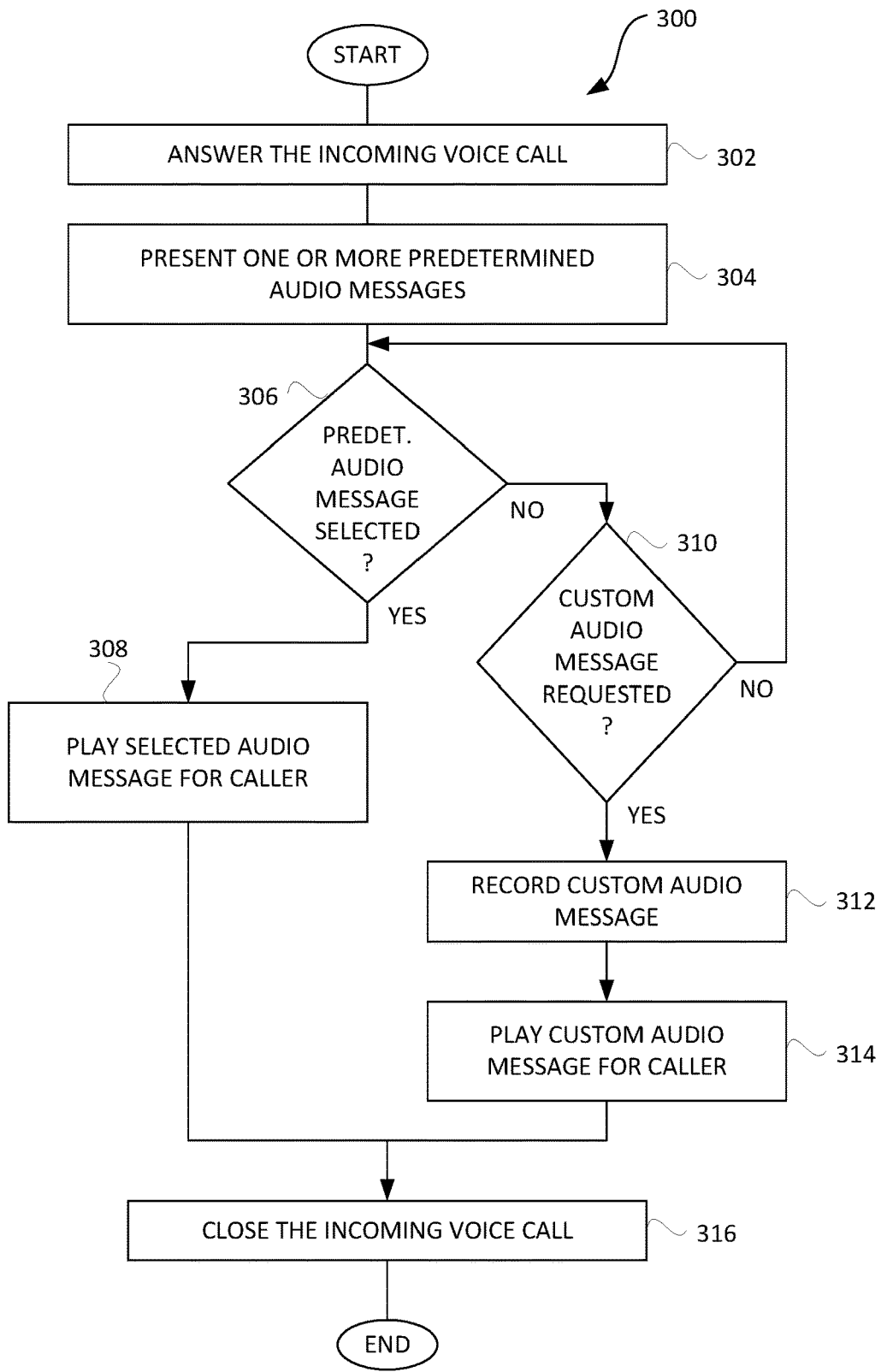
FIG. 8 is a flow diagram of an audio message response process according to one embodiment of the invention.

FIG. 8 is a flow diagram of an audio message response process 300 according to one embodiment of the invention. The audio message response process 300 is, for example, suitable for use as the processing carried out by block 214 illustrated in FIG. 7.

The audio message response process 300 initially answers 302 the incoming voice call. In this operation, the incoming voice call is answered 302 but not in a traditional way. Instead, the electronic circuitry associated with a mobile communication device (e.g., mobile telephone) that receives the incoming voice call operates to answer the incoming voice call for purposes of an audio message response. For example, a voice channel is established between the calling party and the mobile communication device, but the speaker and microphone of the mobile communication device are disabled. In effect, in such an embodiment, neither the called party nor the calling party perceives that the voice calling has been answered.

Next, one or more predetermined audio messages can be presented 304 by the mobile communication device. The presentation 304 of the one or more predetermined audio messages can, for example, be achieved by audio or visual means. For example, the predetermined audio messages can be audio output to a speaker associated with the mobile communication device for the called party or can be visual output (e.g., text) to a display of the mobile communication device for the called party (e.g., user of the mobile communication device).

A decision 306 then determines whether a predetermined audio message has been selected. Here, the decision 306 determines whether the user (i.e., called party) of the mobile communication device has selected one or more of the predetermined audio messages. When the decision 306 determines that a predetermined audio message has been selected, then the selected audio message is played 308 for the calling party. Here, the mobile communication device can output the selected audio message to the calling party over the voice channel. Typically, the mobile communication device of the called party would not produce an audible output at the mobile communication device, so that the called party would not be disturbed by the sending of the audio response. The predetermined audio messages are normally short messages (e.g., not more than 160 characters) so that the duration of time the voice channel is needed and/or the amount of network bandwidth consumed is minimal.

On the other hand, when the decision 306 determines that none of the predetermined audio messages have been selected, then a decision 310 determines whether a custom audio message is requested. A custom audio message is an audio message that is specifically provided for the calling party. When the decision 310 determines that a custom audio message is not being requested, then the audio message response process 300 returns to repeat the decision 306 and subsequent operations. Alternatively, when the decision 310 determines that a custom audio message is requested, then a custom audio message is recorded 312. Thereafter, the custom audio message that has been recorded can be played 314 for the calling party (caller). Here, typically, the custom audio message would be output by the mobile communication device of the called party over the voice channel to the calling party. Typically, the mobile communication device of the called party would not produce an audible output at the mobile communication device, so that the called party would not be disturbed by the sending of the audio response. The custom audio messages are also normally short messages (e.g., not more than 160 characters) so that the duration of time the voice channel is needed and/or the amount of network bandwidth consumed is minimal.

Following the operations 308 and 314, the incoming voice call is closed 316. In other words, after the selected audio message or the custom audio message is played 308, 314, the incoming voice call can be closed 316. Following the block 316, the audio message response process 300 is complete and ends.

The predetermined audio messages that are presented 304 to a called party can be determined in a static or dynamic manner. A static determination would, for example, be when the called party has previously set or recorded an audio message to be utilized. Typically, with static determination, the list of audio messages remains the same (i.e., static) until changed (e.g., by the called party). A dynamic determination would allow the audio messages in the list (or the ordering of the audio messages in the list) to change without specific action by the user or the called party. For example, the list or ordering of the audio messages can depend on preference settings, configuration information, or prior usage. Prior usage can include biasing the list of audio messages such that those messages being most often selected appear higher in the list. The list or ordering of the audio messages can also depend on the calling party, type of calling party, location of calling party or called party, and the like. The list of audio messages can be represented by text and/or graphics (e.g., icons).

The audio message response process 300 flexibly enables a user to either select one or more predetermined audio messages or provide a custom audio message to be used as an audio message response to a calling party. However, it should be recognized that, in other embodiments, an audio message response process can alternatively simply pertain to only providing a custom audio message, or only permitting selection of a predetermined audio message. Further, in still other embodiments, an audio message response process can first determine whether a custom audio message is to be provided before presenting predetermined audio messages. In yet other embodiments, an audio message response process can answer the incoming voice call later in the processing than operation 302 as shown in FIG. 8 (e.g., before operations 308 and 314).

Figure 9:
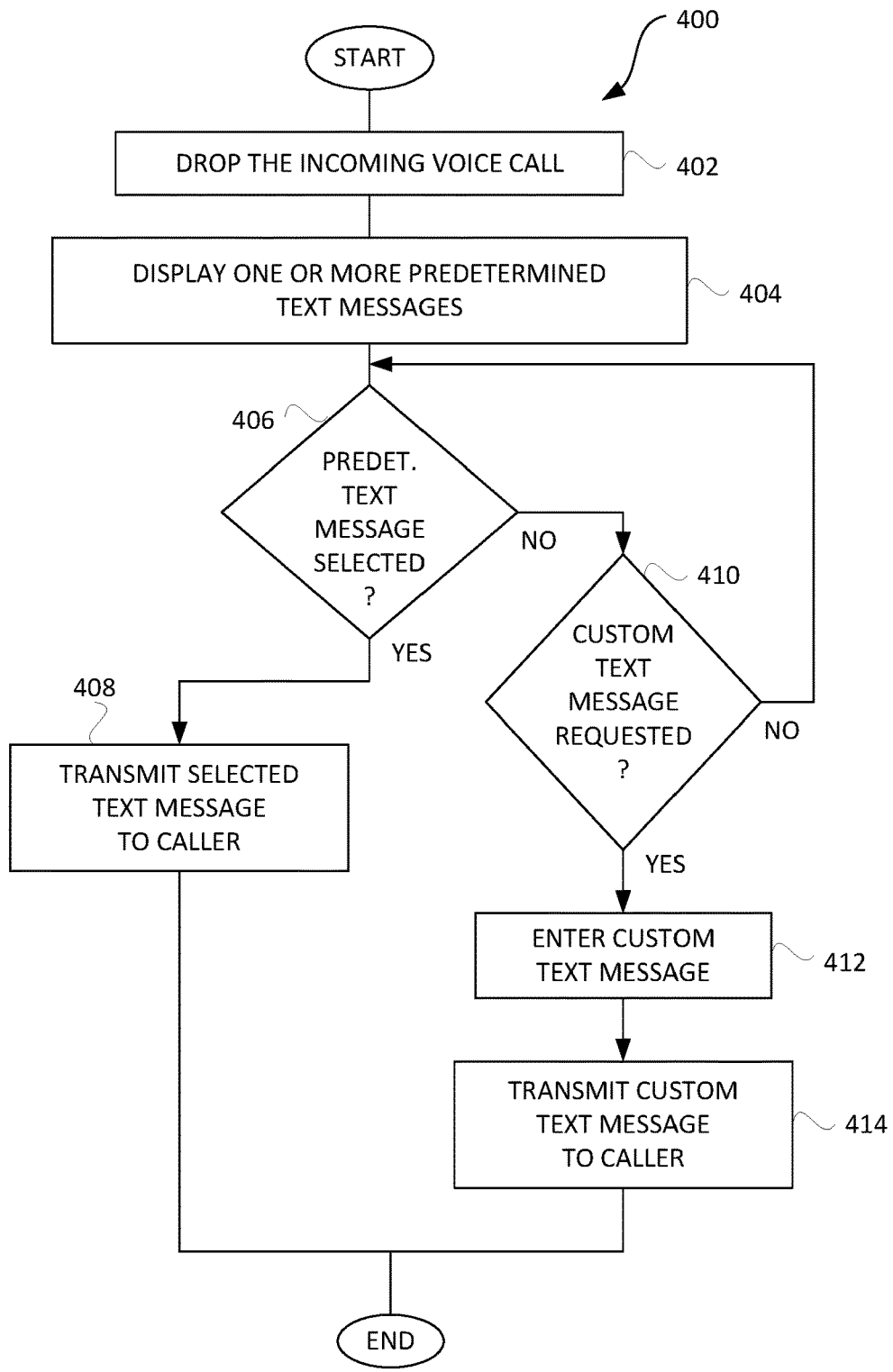
FIG. 9 is a flow diagram of a text message response process according to one embodiment of the invention.

FIG. 9 is a flow diagram of a text message response process 400 according to one embodiment of the invention. The text message response process 400 is, for example, processing performed by the block 218 illustrated in FIG. 7.

The text message response process 400 initially drops 402 the incoming voice call. Here, the information to be supplied to the calling party is a short text message; therefore, there is no need for a voice channel.

Next, one or more predetermined text messages are displayed 404. Here, the one or more predetermined text messages would normally be displayed on a display screen associated with the mobile communication device being utilized by the called party. A decision 406 then determines whether one (or more) of the predetermined text messages has been selected. When the decision 406 determines that a predetermined text message has been selected, then the selected text message is transmitted 408 to the caller (i.e., the calling party).

On the other hand, when the decision 406 determines that a predetermined text message has not been selected, then a decision 410 determines whether a custom text message is requested. When the decision 410 determines that a custom text message is not requested, then the text message response process 400 returns to repeat the decision 406 and subsequent operations. Alternatively, when the decision 410 determines that a custom text message is requested, then the custom text message is entered 412. Here, the called party interacts with the mobile communication device to enter the custom text message. Then, the custom text message is transmitted 414 to the caller. In one embodiment, the transmission 408,414 of the text message can be performed over a communication network, such as a network having a Short Message Service Center (SMSC) supporting Short Message Service (SMS) messages. Following the transmission 408 of the selected text message or the transmission 414 of the custom text message, the text message response process 400 is complete and ends.

An alternative embodiment of a text message response process could operate to answer the incoming voice call and announce to the caller that a text message will be forthcoming. Then, the incoming voice call could be promptly dropped. This additional operation could, for example, be used with the text message response process 400 by providing an additional operation prior to the block 402 illustrated in FIG. 9.

The predetermined text messages being displayed 404 to a called party can be determined in a static or dynamic manner. A static determination would, for example, be a text message the called party has previously set or entered. Typically, with static determination, the list of text messages remains the same (i.e., static) until changed (e.g., by the called party). A dynamic determination would allow the text messages in the list (or the ordering of the text messages in the list) to change automatically, and not by the user. For example, the list or ordering of the text messages can depend on preference settings, configuration information, or prior usage. To illustrate, prior usage can include biasing the list of text messages such that those messages being most often selected appear higher in the list. The list or ordering of the text messages can also depend on the calling party, type of calling party, location of calling party or called party, and the like. The list of text messages can identify each text message with text (e.g., at least a portion of the corresponding text message, or an abbreviation) and/or graphics (e.g., icons).

The text message response process 400 flexibly enables a user to either select one or more predetermined text messages or provide a custom text message to be used as a text message response to a calling party. However, it should be recognized that, in other embodiments, a text message response process can alternatively simply pertain to only providing a custom text message, or only permitting selection of a predetermined text message. Further, in still other embodiments, a text message response process can first determine whether a custom text message is to be provided before presenting predetermined text messages.

Figure 10:
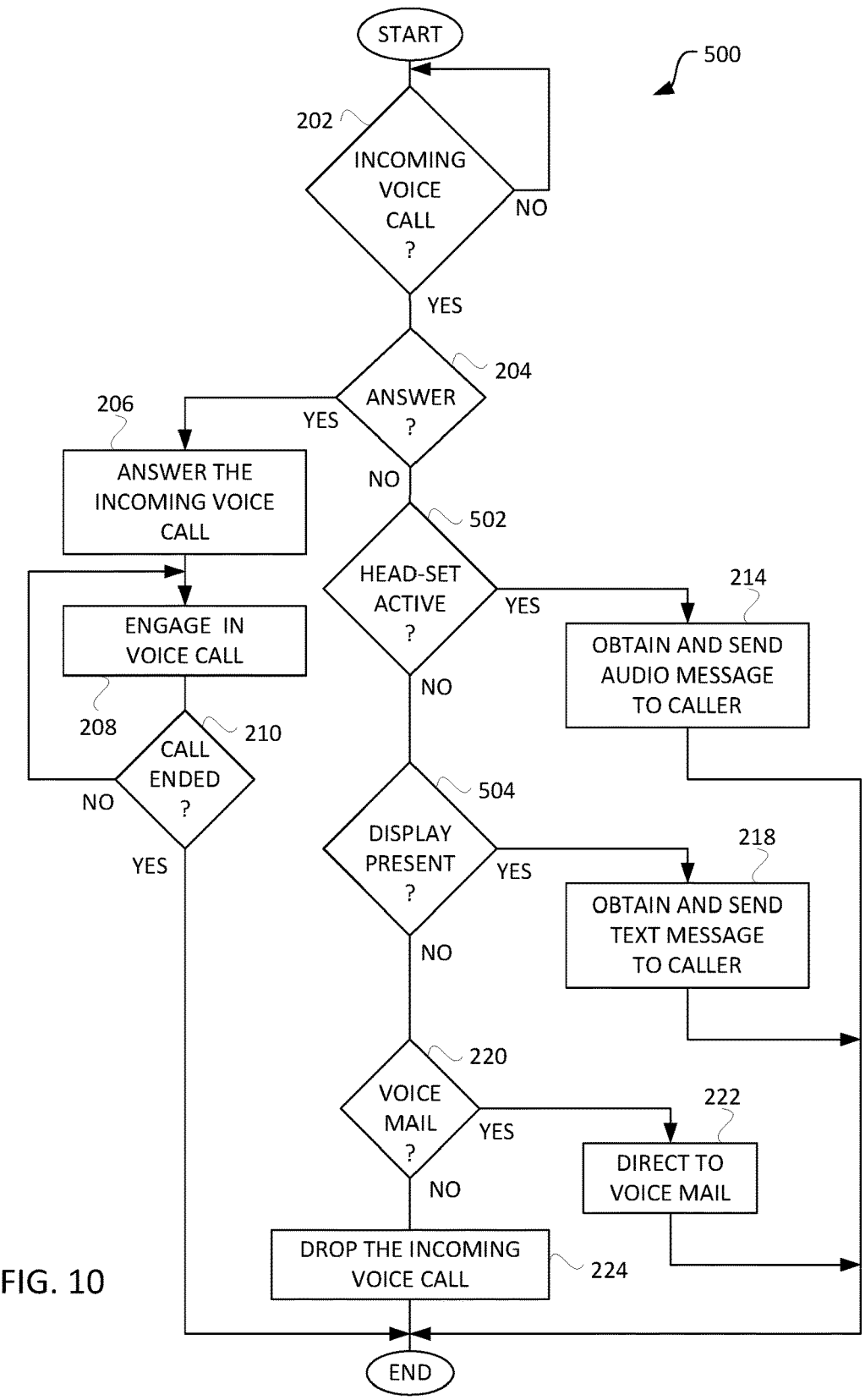
FIG. 10 is a flow diagram of an automated call response process according to one embodiment of the invention.

FIG. 10 is a flow diagram of an automated call response process 500 according to one embodiment of the invention. The automatic call response process 500 is substantially similar in many ways to the personal call response process 200 illustrated in FIG. 7. However, the automated call response process 500 operates to reduce user input at the mobile communication device by making use of stored data pertaining to its hardware components, configuration or preferences. In this regard, the automatic call response process 500 includes a decision 502 that determines whether a head-set is active. When the decision 502 determines that a head-set is active, then the automatic call response process 500 can prefer, suggest or require the user to obtain and send 214 an audio message to the caller in response to an incoming voice call. Alternatively, when the decision 502 determines that a head-set is not active, then a decision 504 can determine whether a display is present. In other words, the decision 504 can determine whether the mobile communication device has a display. When the decision 504 determines that the mobile communication device does have a display, then the mobile communication device can operate to obtain and send 218 a text message to the caller. Of course, this assumes that the caller can support text messages even though they initially called with a voice call. Hence, in another embodiment, the automatic call response process can operate to query or obtain information regarding the caller's communication device capabilities.

An exemplary scenario of how the previously described automatic call response process could work according to one implementation is as follows:

1. From his mobile phone, Bill calls Tom's mobile phone.
2. Tom is alerted by his mobile phone of an incoming call. Optionally, caller information (i.e., pertaining to Bill) can be displayed or announced to Tom.
3. Tom can choose to answer the incoming call or decline to answer the call.
4. In the event that Tom declines to answer the call, Tom can have the opportunity to provide the caller with a brief audio or text message.
5. If an audio message is to be provided, then Tom can either record a personalized message or select one of a plurality of predetermined audio messages. In this case, the incoming call is answered by Tom's mobile phone and then the audio message is played for the caller, thereafter the call is dropped. The audio messages are typically brief (i.e., short), and examples of audio messages are: (i) "Will call in 10 minutes," (ii) "Cannot talk now," (iii) "I'm in a meeting," or (iv) "Please don't call anymore."
6. On the other hand, if a text message is to be provided, then Tom can either enter a personalized text message or select from a plurality of predetermined text messages. In this case, the incoming call is dropped, and the entered text message or the selected one of the predetermined text messages is sent. Examples of text messages are: (i) "Will call in 10 minutes," (ii) "Cannot talk now," (iii) "I'm in a meeting," or (iv) "Please don't call anymore." The text messages can be English (or other language) words or phrases, or can be condensed text strings (e.g., such as slang or chat language). In one embodiment, the predetermined text messages presented to Tom can be dependent on some criteria (i.e., automatically selected). Alternatively, it is possible that Tom might want to edit the predetermined text message, such can be permitted. As yet another example, the text message can embed dynamic information, such as position, e.g., "I'm in [position] now, so I'll get back to you later." The position can be determined using a GPS receiver in the mobile phone or acquired by a remote computer and provided to the mobile phone. The position may also be further processed (locally or remotely) into a more user-friendly form, such as city, school, restaurant name, or street type addresses. The position could also be used above to assist the user in deciding whether to answer the incoming call or decline to answer the call.

7. If hardware components, configuration or preferences are taken into consideration, as illustrated in FIG. 10, the above scenario can be modified. For example, if Tom is using a head-set with his mobile phone, then an audio message may be most convenient, assuming that Tom wants to provide a particular (i.e., customized) message to Bill. The head-set allows Tom to record a brief audio message. Less conveniently, the head-set can be used to present a list of predetermined audio messages and allow Tom's selection therefrom by a button or voice-command.

8. If Tom is not using a head-set, then a text message response might be more suitable. This would typically require that Tom's mobile phone have a display and a keypad. Even so, without a head-set, Tom could still record an audio message, though such would likely be less convenient.

9. Tom can also not provide an audio message or a text message and simply let the incoming call roll-over into voice mail.

The exemplary scenario can also be used in a case where the called party is using one line but the mobile device has multi-line capabilities or call waiting. In such case, the mobile phone can enable the called party to provide a brief audio or text message to the calling party as noted above. Alternatively, the mobile phone can itself automatically (i.e., without user input) respond to the calling party via an audio or text message since the mobile phone is aware that the called party is on the other line.

In this aspect of the invention, the calling party and the called party often use mobile communication devices, such as mobile phones. However, the parties can alternatively use other electronic devices, such as a PDA, a computer, etc. Further, the option to provide a text response could be prevented if the caller's device is known to not support text messages.

The advantages of the previously described embodiments are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. In still another advantage, a user can provide feedback to a caller without answering a voice call from the caller.

Another aspect of the invention pertains to improved approaches to respond to an incoming text message. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

Figure 11:
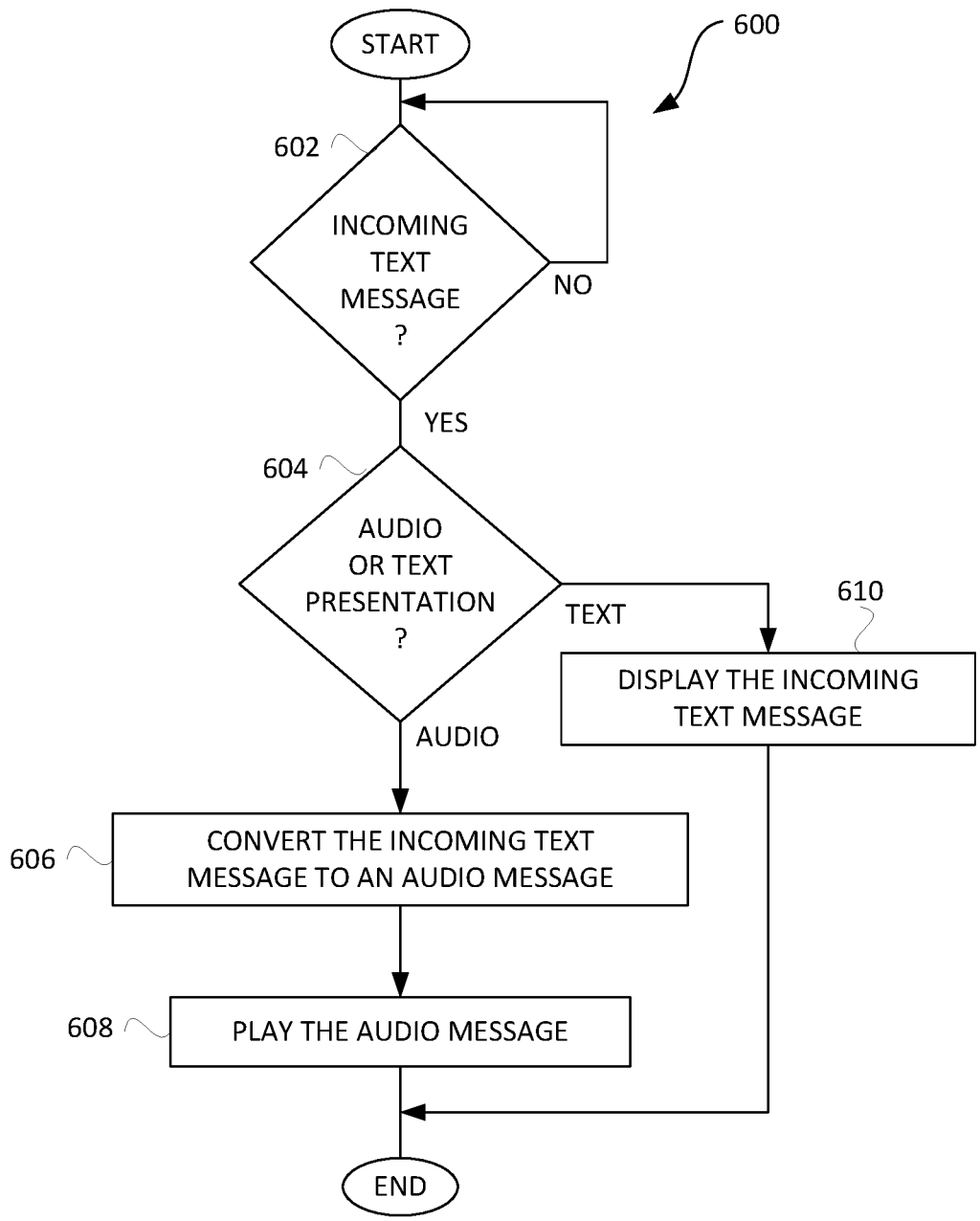
FIG. 11 is a flow diagram of a message presentation process according to one embodiment of the invention.

FIG. 11 is a flow diagram of a message presentation process 600 according to one embodiment of the invention. The message presentation process 600 is performed by an electronic device, such as a mobile communication device.

The message presentation process 600 begins with a decision 602 that determines whether an incoming text message is present. Typically, the incoming text message would be transmitted to the mobile communication device from another communication device. When the decision 602 determines that an incoming text message is not present, then the message presentation process 600 awaits such message. Once the decision 602 determines that an incoming text message has been received, a decision 604 determines whether an audio or text presentation is to be utilized. The decision 604 can be performed in a variety of different ways. For example, the determination of whether to utilize an audio or text presentation can be based on user input or can be automatically determined through a use of configuration or preference information or hardware components (e.g., display, speaker, head-set).

When the decision 604 determines that an audio presentation is to be utilized, the incoming text message is converted 606 to an audio message. For example, a text-to-speech conversion can be performed. In one embodiment, a user of the electronic device can be permitted to choose speech characteristics, such as a voice, tone, pace, accent, or mood, for the resulting speech. For example, a user could choose speech characteristics by preference settings. In another embodiment, the incoming text message can include or reference speech characteristics so that the initiator can control or influence speech characteristics. In still another embodiment, if the text to be converted contains condensed text (e.g., such as slang or chat language), the resulting speech can pertain to an uncondensed form of the text. The ability to convert from condensed text to resulting speech for uncondensed text can be facilitated by pattern matching. For example, in chat language "LOL" can be converted to an audio message for "lots of love." In one implementation, a table can store audio messages corresponding to chat terms or phrases. In another implementation, a first table would store uncompressed terms or phrases corresponding to chat terms or phrases, and a second table would store audio messages corresponding to the uncompressed terms or phrases.

After the incoming text message is converted to the audio message, the audio message is played 608. Typically, the audio message is played 608 by the mobile communication device for the user. For example, the audio message can be output to a speaker of the mobile communication device or a headset used therewith. As a result, the user of the mobile wireless communication device receives an audio message even though the incoming message was a text message.

On the other hand, when the decision 604 determines that a text presentation is to be utilized, the incoming text message is displayed 610. Here, the incoming text message would be displayed 610 on a display associated with the mobile communication device. Following the blocks 608 and 610, the message presentation process 600 ends.

As discussed above, text-to-speech conversion can be invoked and performed on an electronic device, which may be a mobile communication device. While text-to-speech conversion, particularly if high quality is desired, requires substantial processing capabilities, mobile electronic devices, such as mobile communication devices, given their small form factor and price competition, tend to have limited processing capability. Accordingly, in one embodiment, text-to-speech conversion can be off-loaded from the mobile device. For example, a remote server computer can be provided the text message and produce the resulting audio message, and then supply the audio message to the mobile device. The remote server computer can be a networked server coupled to the network 108. One example of a networked server is a gateway computer for a wireless electronic device, such as a mobile telephone.

Figure 12:
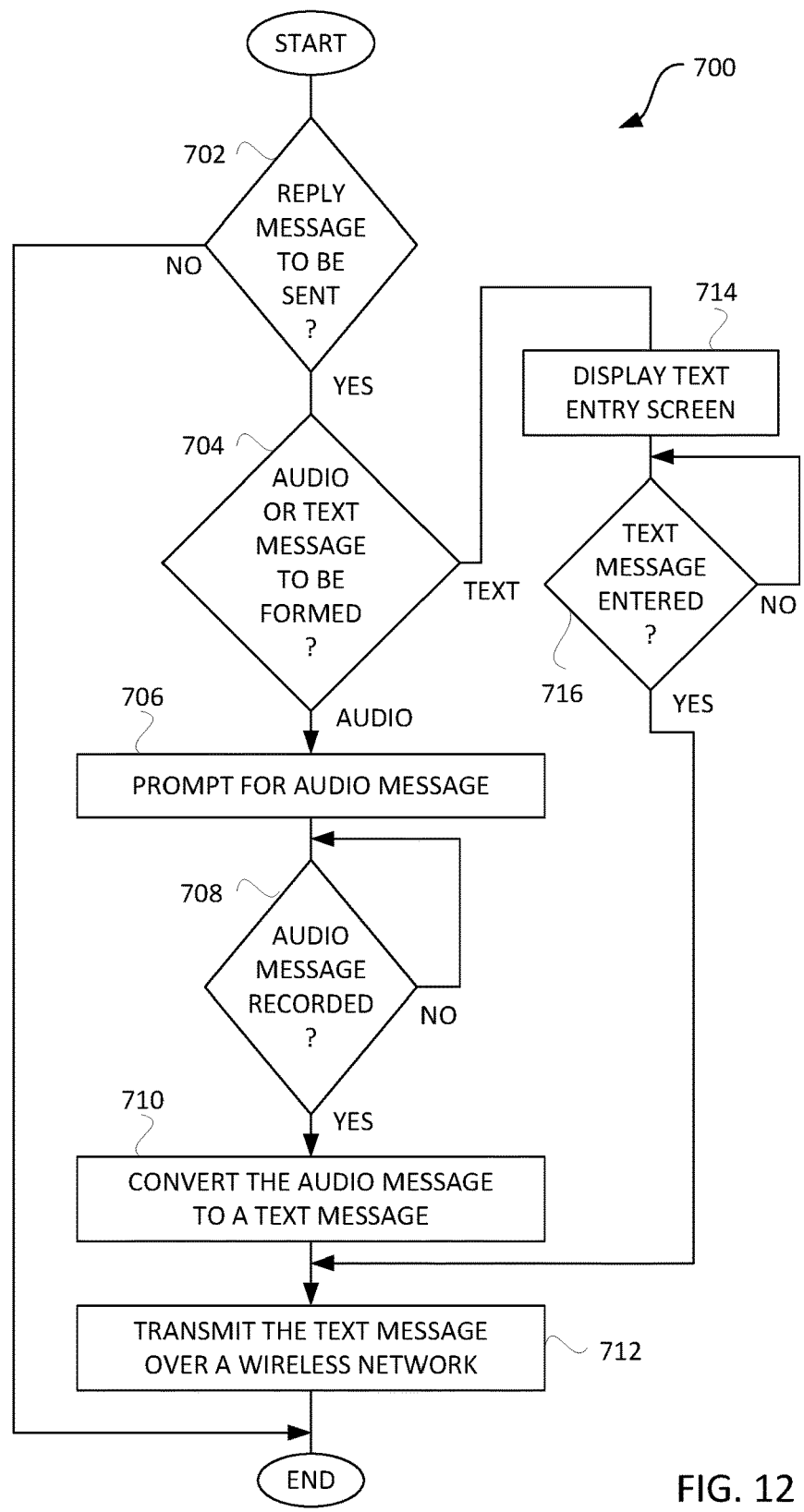
FIG. 12 is a flow diagram of a message presentation process according to one embodiment of the invention.

FIG. 12 is a flow diagram of a reply message process 700 according to one embodiment of the invention. The reply message process 700 is performed by an electronic device, such as a mobile communication device.

The reply message process 700 begins with a decision 702 that determines whether a reply message is to be sent. Typically, the reply message process 700 follows the presentation of an incoming text message to a user of a mobile communication device. Hence, the reply message to be sent is a reply to the incoming text message. However, in other embodiments, the reply message to be sent can be merely an initial message as opposed to a response to an earlier message.

In any case, when the decision 702 determines that a reply message is not to be sent, then the reply message process 700 ends or simply awaits the need to send a reply message. On the other hand, when the decision 702 determines that a reply message is to be sent, then a decision 704 determines whether an audio or text message is to be formed. The decision 704 can be performed in a variety of different ways. For example, the determination of whether to send an audio or text message can be based on user input or can be automatically determined through a use of configuration or preference information or hardware components (e.g., display, speaker, head-set).

When the decision 704 determines that an audio message is to be formed, then the reply message process 700 prompts 706 for an audio message. Here, the prompt 706 can be directed to the user of the mobile communication device. The prompt can be an audio or textual indication. Next, a decision 708 determines whether an audio message has been recorded. When the decision 708 determines that the audio message has not been recorded, then the reply message process 700 awaits the audio message. Once the decision 708 determines that the audio message has been recorded, then the audio message is converted 710 to a text message. In one embodiment, if the audio message recorded is greater than a maximum text message size (e.g., 150 or 160 characters), then the audio message can be shortened so that the resulting text message does not exceed the maximum text message size. One way to shorten the text message is to use abbreviations. For example, the words "For example" can be changed to "e.g.". Such conversion can be again be performed by matching entries in tables. Another way to shorten is to remove non-essential text. Still another way to shorten is to clip off or truncate the text message at the maximum text message size. In another embodiment, the resulting text message might provide an indication that it was converted from an audio message. Following the block 710, the text message is transmitted 712 over a wireless network.

Alternatively, when the decision 704 determines that a text message is to be formed, then a text entry screen is displayed 714. Next, a decision 716 determines whether a text message has been entered. When the decision 716 determines that a text message has not yet been entered, then the reply message process 700 awaits entry of the text message. Once the text message has been entered, the text message is transmitted 712 over the wireless network. Following the block 712, the reply message process 700 ends.

Although the reply message process 700 provides for the user to enter a custom text or audio message, it should be understood that the reply message can alternatively be formed through use of semi-custom or predetermined reply messages from which the user of the mobile communication device can choose. The use of semi-custom or predetermined reply messages can be achieved as noted above in a number of embodiments, and can serve to simplify the conversion process.

An exemplary scenario of how message presentation and reply message processes could work according to one implementation of the second aspect is as follows:

1. From his mobile phone, Bill prepares and sends a text message to Tom's mobile phone.

2. Tom is alerted by his mobile phone of an incoming text message, such as by displaying at least a portion of the text message and/or otherwise notifying Tom of the text message.

3. Tom's mobile phone can decide whether to present the text message on a display screen of Tom's mobile phone, or to first convert the text message to an audio message and then present the audio message to Tom (e.g., play the audio message). Of course, Tom can interact with Tom's mobile phone to assist in making the determination on how to present the message.

4. Thereafter, if desired, Tom can prepare and send a reply message back to Bill. This reply message can be prepared initially as a text message or an audio message. Tom's mobile phone and/or Tom can determine whether the reply message is initially prepared as a text message or as an audio message. If an audio message is initially created, such audio message must be converted to a text message prior to transmission. Eventually, the reply message is sent to Bill as a text message. Tom's mobile phone can assist with the creation of the reply message through use of custom, semi-custom or predetermined reply message from which Tom and/or Tom's mobile phone can choose.

5. If Tom is using a head-set with his mobile phone, then an audio message may be more convenient, assuming that Tom wants to provide a particular (i.e., customized) message to Bill. The head-set allows Tom to easily record a brief audio message. Less conveniently, the head-set can be used to present a list of predetermined audio messages and allow Tom's selection therefrom by a button or voice-command.

6. If Tom is not using a head-set, then a text message response might be more suitable. This would typically require that Tom's mobile phone have a display and a keypad. Even so, without a head-set, Tom could still record an audio message, though such would likely be less convenient.

7. Tom can also not provide a reply message and simply not respond to the incoming text message. Alternatively, Tom can configure his mobile phone to automatically produce and send a reply message based on user settings or preferences, position, configuration, status, etc.

In this aspect of the invention, the calling party and the called party often use mobile communication devices, such as mobile phones. However, the parties can alternatively use other electronic devices, such as a PDA, a computer, etc.

The advantages of the invention exemplified by FIGS. 11-12 are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. Still another advantage is that conversion of an audio message to a text message facilitates use a low cost network (such as the SMS network). Another advantage is reduced network bandwidth load. Yet still another advantage is that the sender can get back a message in the same format as they sent the original message, though the recipient may use the message in a different format or mode (e.g., recipient hears the text message as an audio message).

Moreover, it should be noted that with regards to any of the embodiments in which a voice call or a text message is incoming to an electronic device, not only can the user of the mobile device take an action (e.g., button press or voice-command) to decline the call/message but also the electronic device itself can automatically decline the call/message such that the user is not disturbed. For example, an electronic device can be configured through user settings (e.g., preferences) to decline calls/messages matching certain criteria. Also, an auto reply message can be configured to be automatically sent in response to the call/message. For a known, undesired marketing caller/message sender, the electronic device can automatically send a reply message demanding the sender not to call or send messages anymore, and to remove your information from their database.

Text messages received or sent can optionally embed indications of speech characteristics to be used, should the text message be converted to an audio format. The speech characteristics can pertain to voice, tone, pace, accent, and/or mood. The speech characteristics for the resulting speech can be set in preference or configuration information, set on a per message basis by users, or set by evaluation of monitored data pertaining to the user.

Additionally, the messages being transmitted can be encrypted for security purposes.

In one embodiment, an electronic device performing communications using audio and/or text messages according to the invention can further integrate (or have tethered thereto) one or more electrical components for enhancing the hearing of the user of the electronic device. The electronic device will normally include a microphone and a speaker. The invention described herein can be considered an automated secretary for a user of an electronic device. The automated secretary can completely or partially respond to an incoming call/message so as to reduce disturbances to the user. The user can personalize the automated secretary through user settings (e.g., preferences), or the automated secretary can learn over time how to handle different incoming calls/messages. Besides handling or assisting the user with incoming calls/messages, the automated secretary can also assist with other activities, such as making calendar entries (e.g., meetings) in a calendar or responding to incoming callers/messages with relevant information pertaining to the user's schedule as maintained by the calendar (though the user could restrict such access to certain information and/or inquiring parties). For example, if an incoming text message asks "available for lunch today?", the automated secretary can check the user's availability for lunch by way of the user's calendar, then if the user is not available the automated secretary can quickly informing the inquiring party of same or propose another date. On the other hand, if the lunch time period is available in the user's calendar, then the automated secretary can either directly respond to the inquiring party of acceptance or propose a response to the user for review, modification and/or transmission.

It should be obvious to those skilled in the art that a number of embodiments performing communications using voice as well as audio and/or text messages can be implemented using voice over Internet Protocol technologies, with signals delivered over the Web. For example, a calling party's communication or mobile device can include an adapter to convert voice signals to data packets before sending them over the Internet. A service provider can convert the packets back into voice signals before sending the voice signals to the called party's communication device. Similarly, embodiments can be implemented using voice over wireless protocols, such as Wi-Fi or Wi-Max networks. Using such technologies, computing devices can become communication devices.

The various embodiments, implementations, features and aspects of the invention noted above can be combined in various ways or used separately. Those skilled in the art will understand from the description that the invention can be equally applied to or used in other different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An article for managing messaging of a plurality of users using at least a network-based portal at least based on Internet protocol, with different communication modes allowed, depending on each of the plurality of users having an identifier for use with the different communication modes, with the corresponding identifier being set via the network-based portal, and without requiring the plurality of users to disclose their contact information to each other, the article comprising:
 a non-transitory computer readable storage medium comprising a plurality of instructions, when executed by at least a server, result in the at least a server:
 providing a plurality of communication modes to a first user to allow the first user to use one of the plurality of communication modes as a selected communication mode for a message from the first user to a second user via an electronic device associated with the second user, with the first user being identified at least depending on a prior registration process by the first user regarding the use of the network-based portal,
 wherein the plurality of communication modes include at least text communication using a personal computer, voice communication using a personal computer, text communication using a mobile phone, voice communication using a mobile phone, and communication with at least an image, and
 wherein messages are eligible to be received by the electronic device associated with the second user based on any of the plurality of communication modes, all depending on an identifier associated with the second user being set by the second user via the network-based portal, at least in view of the network-based portal based on the Internet protocol;
 receiving an urgency indication regarding the message, wherein the urgency indication being from the first user via an electronic device associated with the first user; and
 enabling, via the network-based portal, the message to be received by the second user through the electronic device associated with the second user, using the selected communication mode, based on the identifier associated with the second user, in view of the second user not blocking the first user from using the selected communication mode to reach the second user, via the network-based portal, wherein the plurality of instructions, when executed by the at least a server,
 further result in the at least a server:
 receiving, from the second user, contact information associated with the second user to allow the second user to participate and at least receive messages via the network-based portal;

determining availability of the second user; and enabling a notification to reach the second user via the network-based portal, at least in view of receiving the urgency indication regarding the message and at least in view of the first user not being blocked from reaching the second user via the network-based portal, with the notification for notifying the second user, wherein even when the message is received by the second user through the electronic device associated with the second user depending on the identifier associated with the second user, the contact information associated with the second user is not provided via the network-based portal to the first user through the electronic device associated with the first user, and wherein the identifier associated with the second user is distinct from the contact information associated with the second user.

2. An article for managing messaging as recited in claim 1, wherein the notification is enabled to be generated at least in an audio manner.

3. An article for managing messaging as recited in claim 2, wherein the plurality of instructions, when executed by the at least a server, further result in the at least a server not interrupting the second user by the message unless overridden based on the urgency indication regarding the message.

4. An article for managing messaging as recited in claim 3, wherein the plurality of instructions, when executed by the at least a server, further result in the at least a server receiving data regarding a setting digitally set by the second user at the electronic device associated with the second user, wherein the second user would not be interrupted by the message in view of the received data regarding the setting, unless overridden based on the urgency indication regarding the message.

5. An article for managing messaging as recited in claim 1, wherein the plurality of instructions, when executed by the at least a server, further result in the at least a server not interrupting the second user by the message unless overridden based on the urgency indication regarding the message.

6. An article for managing messaging as recited in claim 1, wherein the plurality of instructions, when executed by the at least a server, further result in the at least a server receiving data regarding a setting digitally set by the second user at the electronic device associated with the second user, wherein the second user would not be interrupted by the message in view of the received data regarding the setting, unless overridden based on the urgency indication regarding the message.

7. A non-transitory computer readable medium including at least executable computer program code stored therein for managing electronic communications of a plurality of users using at least a network-based portal at least based on Internet protocol, with different communication modes allowed, depending on each of the plurality of users having an identifier for use with the different communication modes, with the corresponding identifier being set via the network-based portal, and without requiring the plurality of users to disclose their contact information to each other, said computer readable medium comprising:

computer program code for providing a plurality of communication modes to a first user to allow the first user to use one of the plurality of communication modes as a selected communication mode for a first message from the first user to a second user via an electronic device associated with the second user, with the first user being identified at least depending on a prior registration process by the first user regarding the use of the network-based portal, wherein the plurality of communication modes include at least text communication using a personal computer, voice communication using a personal computer, text communication using a mobile phone, voice communication using a mobile phone, and communication with at least an image, and wherein messages are eligible to be received by the electronic device associated with the second user based on any of the plurality of communication modes, all depending on an identifier associated with the second user being set by the second user via the network-based portal, at least in view of the network-based portal based on the Internet protocol;

computer program code for permitting the second user to block the first user from using at least the selected communication mode to reach the second user via the network-based portal;

computer program code for enabling, via the network-based portal, the first message to be received by the second user via the electronic device associated with the second user, using the selected communication mode, depending on the identifier associated with the second user, in view of the second user not blocking the first user from using the selected communication mode to reach the second user, via the network-based portal;

computer program code for determining availability of the second user; and computer program code for receiving, from the second user, contact information associated with the second user to allow the second user to participate and at least receive messages via the network-based portal, wherein even when the first message is received by the second user via the electronic device associated with the second user depending on the identifier associated with the second user, the contact information associated with the second user is not provided via the network-based portal to the first user via an electronic device associated with the first user, and wherein the identifier associated with the second user is distinct from the contact information associated with the second user.

8. A non-transitory computer readable medium as recited in claim 7, wherein said computer readable medium comprises computer program code for:

receiving an urgency indication from the first user to the second user via the electronic device associated with the first user; and enabling an urgent notification to be generated to notify the second user at least in view of receiving the urgency indication.

9. A non-transitory computer readable medium as recited in claim 8, wherein the urgent notification is enabled to be generated at least in an audio manner.

10. A non-transitory computer readable medium as recited in claim 7, wherein the identifier associated with the second user includes a digital identity of the second user.

11. A non-transitory computer readable medium as recited in claim 7, wherein the contact information associated with the second user allows the second user to be electronically contacted based on the contact information, without using the network-based portal.

12. A non-transitory computer readable medium as recited in claim 7, wherein the availability of the second user is related to receiving messages, wherein the electronic device associated with the second user is a mobile phone, and
wherein the electronic device associated with the first user is a mobile phone.

13. A non-transitory computer readable medium as recited in claim 7, wherein said computer readable medium comprises computer program code for receiving an audio message from the second user after the second user has received the first message, if the first user is not blocked from reaching the second user, and transforming the audio message into a text message to be received by the first user.

14. A non-transitory computer readable medium as recited in claim 13,
wherein the first message is a text message from the first user, and
wherein said computer readable medium comprises computer program code for transforming the text message from the first user into an audio message so that the text message from the first user is received by the second user in an audio manner via a speaker if the first user is not blocked from reaching the second user.

15. A non-transitory computer readable medium as recited in claim 14,
wherein the electronic device associated with the second user is a mobile phone, and
wherein the electronic device associated with the first user is a mobile phone.

16. A non-transitory computer readable medium as recited in claim 13, wherein the contact information associated with the second user allows the second user to be electronically contacted based on the contact information, without using the network-based portal.

17. A non-transitory computer readable medium as recited in claim 16,
wherein the first message is a text message from the first user, and
wherein said computer readable medium comprises computer program code for transforming the text message into an audio message so that the text message is received by the second user in an audio manner via a speaker if the first user is not blocked from reaching the second user.

18. A non-transitory computer readable medium as recited in claim 16, wherein said computer readable medium comprises computer program code for:
receiving an urgency indication for the second user, with the urgency indication being from the first user; and
enabling an urgent notification to be generated to notify the second user at least in view of receiving the urgency indication from the first user to the second user.

19. A non-transitory computer readable medium as recited in claim 18, wherein the urgent notification is enabled to be generated at least in an audio manner.

20. A non-transitory computer readable medium as recited in claim 7,
wherein the first message is a text message, and
wherein said computer readable medium comprises computer program code for transforming the text message into an audio message so that the text message is received by the second user in an audio manner via a speaker if the first user is not blocked from reaching the second user.

21. A non-transitory computer readable medium as recited in claim 7,
wherein the first message is not an audio message, and
wherein said computer readable medium comprises computer program code for transforming the first message into an audio message so that the first message is received by the second user in an audio manner via a speaker if the first user is not blocked from reaching the second user.

22. A non-transitory computer readable medium as recited in claim 7,
wherein the identifier associated with the second user includes a digital identity of the second user, and
wherein the contact information associated with the second user allows the second user to be electronically contacted based on the contact information, without using the network-based portal.

23. A non-transitory computer readable medium as recited in claim 22, wherein the contact information associated with the second user includes at least one of a phone number or an email address of the second user.

24. A non-transitory computer readable medium as recited in claim 23,
wherein the electronic device associated with the second user is a mobile phone, and
wherein the electronic device associated with the first user is a mobile phone.

25. A non-transitory computer readable medium as recited in claim 24, wherein said computer readable medium comprises computer program code for receiving an audio message from the second user after the second user has received the first message, if the first user is not blocked from reaching the second user, and transforming the audio message into a text message to be received by the first user.

26. A non-transitory computer readable medium as recited in claim 25, wherein the first message is a text message from the first user.

27. A non-transitory computer readable medium as recited in claim 26, wherein said computer readable medium comprises computer program code for transforming the text message from the first user into an audio message so that the text message from the first user is received by the second user in an audio manner via a speaker if the first user is not blocked from reaching the second user.

28. A non-transitory computer readable medium as recited in claim 25,
wherein the first message is not an audio message, and
wherein said computer readable medium comprises computer program code for transforming the first message into an audio message so that the first message is received by the second user in an audio manner via a speaker if the first user is not blocked from reaching the second user.

29. A non-transitory computer readable medium as recited in claim 28, wherein said computer readable medium comprises computer program code for:
receiving a notification indication from the second user via the electronic device associated with the second user, with the notification indication regarding another message;
enabling a notification to reach the first user via the network-based portal, at least in view of receiving the notification indication; and
not interrupting the first user by the another message, unless overridden based on the notification indication regarding the another message.

30. A non-transitory computer readable medium as recited in claim 29, wherein the notification at least conveys urgency.

31. A non-transitory computer readable medium as recited in claim 23, wherein said computer readable medium comprises computer program code for:

receiving a notification indication from the second user via the electronic device associated with the second user, with the notification indication regarding another message;

enabling a notification to reach the first user via the network-based portal, at least in view of receiving the notification indication; and not interrupting the first user by the another message, unless overridden based on the notification indication regarding the another message.

32. A non-transitory computer readable medium as recited in claim 31, wherein the notification at least conveys urgency.

33. A non-transitory computer readable medium as recited in claim 7, wherein said computer readable medium comprises computer program code for receiving a second message from the second user to the first user, wherein one of the first message or the second message is voice and the other one of the first message or the second message is text.

34. A non-transitory computer readable medium as recited in claim 7,
wherein the enabling the first message to be received by the second user depends on an identifier associated with the first user,
wherein the identifier associated with the second user is a digital identity of the second user,
wherein the identifier associated with the first user is a digital identity of the first user, and
wherein the contact information associated with the second user allows the second user to be electronically contacted based on the contact information, without using the network-based portal.

35. A non-transitory computer readable medium as recited in claim 7,
wherein the enabling the first message to be received by the second user depends on an identifier associated with the first user,
wherein the contact information associated with the second user allows the second user to be electronically contacted based on the contact information, without using the network-based portal, and
wherein said computer readable medium comprises computer program code for receiving a second message from the second user for the first user, wherein one of the first message or the second message is a voice message, and the other one of the first message or the second message is a text message, thereby allowing the first user and the second user to communicate using different communication modes, based on the identifier associated with the first user and the identifier associated with the second user.

36. A non-transitory computer readable medium as recited in claim 35,
wherein one of the electronic device associated with the first user or the electronic device associated with the second user is an electronic device with a computer keyboard, and
wherein the other one of the electronic device associated with the first user or the electronic device associated with the second user is an electronic device without a computer keyboard.

37. A non-transitory computer readable medium as recited in claim 36, wherein said computer readable medium comprises computer program code to enable the second user to select a predetermined message to send to the first user, the predetermined message being selected from a set of predetermined messages provided to the second user.

38. A computer-implemented method for managing electronic communications of a plurality of users using at least a network-based portal at least based on Internet protocol, with different communication modes allowed, depending on each of the plurality of users having an identifier for use with the different communication modes, with the corresponding identifier being set via the network-based portal, and without requiring the plurality of users to disclose their contact information to each other, said method comprising:

providing a plurality of communication modes to a first user to allow the first user to use one of the plurality of communication modes as a selected communication mode for a first message from the first user to a second user via an electronic device associated with the second user, with the first user being identified at least depending on a prior registration process by the first user regarding the use of the network-based portal,
wherein the plurality of communication modes include at least text communication using a mobile phone, voice communication using a mobile phone, and communication with at least an image, and
wherein messages are eligible to be received by the electronic device associated with the second user based on any of the plurality of communication modes, all depending on an identifier associated with the second user being set by the second user via the network-based portal, at least in view of the network-based portal based on the Internet protocol;

permitting the second user to block the first user from using at least the selected communication mode to reach the second user via the network- based portal;

enabling, via the network-based portal, the first message to be received by the second user via the electronic device associated with the second user, using the selected communication mode, depending on the identifier associated with the second user, in view of the second user not blocking the first user from using the selected communication mode to reach the second user, via the network-based portal;

determining availability of the second user; and receiving, from the second user, contact information associated with the second user to allow the second user to participate and at least receive messages via the network-based portal,
wherein even when the first message is received by the second user via the electronic device associated with the second user depending on the identifier associated with the second user, the contact information associated with the second user is not provided via the network-based portal to the first user via the electronic device associated with the first user, and
wherein the identifier associated with the second user is distinct from the contact information associated with the second user.

39. A computer-implemented method as recited in claim 38,
wherein the enabling the first message to be received by the second user depends on an identifier associated with the first user, and
wherein the contact information associated with the second user allows the second user to be electronically contacted based on the contact information, without using the network-based portal.

40. A computer-implemented method as recited in claim 39,
wherein the contact information associated with the second user includes at least one of a phone number or an email address of the second user.

41. A computer-implemented method as recited in claim 40 comprising receiving a second message from the second user for the first user, wherein one of the first message or the second message is a voice message, and the other one of the first message or second message is a text message, thereby allowing the first user and the second user to communicate using different communication modes, based on the identifier associated with the first user and the identifier associated with the second user.

42. A computer-implemented method as recited in claim 41 comprising enabling the second user to select a predetermined message to send to the first user, the predetermined message being selected from a set of predetermined messages provided to the second user.

43. A computer-implemented method as recited in claim 41 comprising receiving an urgency indication from the second user to the first user via the electronic device associated with the second user to generate an urgent notification to notify the first user.

44. A computer-implemented method as recited in claim 43, wherein the urgent notification is enabled to be generated at least in an audio manner.

45. A computer-implemented method as recited in claim 41 comprising enabling the second user to select a predetermined message to send to the first user, the predetermined message being selected from a set of predetermined messages provided to the second user,
wherein an urgency indication is received from the second user to the first user via the electronic device associated with the second user to generate an urgent notification to notify the first user.

46. A non-transitory computer readable medium including at least executable computer program code stored therein that facilitates electronic communication of a plurality of users using at least a network-based portal at least based on Internet protocol, with a plurality of modes of communication available for the plurality of users to communicate, with each of the plurality of users having an identifier for use with the plurality of modes of communication, and without requiring the plurality of users to disclose their contact information to each other, the computer readable medium comprising:
computer program code for providing a plurality of modes of communication to a first user to allow the first user to use one of the plurality of modes of communication as a selected mode of communication for a first message to be sent from the first user to a second user, based on an identifier associated with the first user previously set by the first user via the network-based portal,
wherein the plurality of modes of communication supported by the network-based portal include at least text communication using a personal computer, voice communication using a personal computer, text communication using a mobile phone voice communication using a mobile phone, and communication with at least an image, and
wherein messages are eligible to be received electronically by the second user via the network-based portal, based on any of the plurality of modes of communication, all depending on an identifier associated with the second user previously set by the second user via the network-based portal, which allows the second user to efficiently maintain the second user's communication using the plurality of modes of communication;
computer program code for permitting the second user to block the first user from using at least the selected mode of communication to communicate with the second user via the network-based portal, based on the identifier associated with the first user;
computer program code for enabling the first message to be electronically provided to the second user, using the selected mode of communication, depending on the identifier associated with the second user, in view of the second user not blocking the first user from using the selected mode of communication to communicate with the second user, via the network-based portal;
computer program code for determining availability of the second user related to receiving messages; and
computer program code for receiving, from the second user, contact information associated with the second user to allow the second user to participate and at least receive messages via the network-based portal,
wherein even when the first message is received by the second user via the selected mode of communication, the contact information associated with the second user is not provided via the network-based portal to the first user, and contact information associated with the first user is not provided via the network- based portal to the second user, so as to provide an option to the second user to keep the contact information associated with the second user confidential from the first user, and to provide an option to the first user to keep the contact information associated with the first user confidential from the second user, and
wherein the identifier associated with the second user is distinct from the contact information associated with the second user, and the identifier associated with the first user is distinct from the contact information associated with the first user.

47. A non-transitory computer readable medium as recited in claim 46, wherein the computer readable medium comprises:
computer program code for receiving an indication from the second user for the first user via the network-based portal to generate an urgent notification for the first user; and
computer program code for enabling the urgent notification to be generated to notify the first user at least in view of receiving the indication.

48. A non-transitory computer readable medium as recited in claim 47, wherein the urgent notification is enabled to be generated at least in an audio manner.

49. A non-transitory computer readable medium as recited in claim 46, wherein the computer readable medium comprises:
computer program code for determining whether the second user has blocked the first user from using the selected mode of communication to communicate the first message with the second user, via the network-based portal;
computer program code for receiving a notification indication from the first user to the second user via the network-based portal, with the notification indication regarding another message; and
computer program code for enabling the another message to be electronically provided to the second user, in view of the notification indication, even though the second user has blocked the first user from using the selected mode of communication to communicate the first message with the second user.

50. A non-transitory computer readable medium as recited in claim 49, wherein the another message conveys at least urgency.

51. A non-transitory computer readable medium as recited in claim 46,
wherein the network-based portal allows the first user to receive messages from the second user via an electronic device associated with the second user that has a first set of buttons for receiving user input,
wherein the network-based portal allows the second user to receive messages from the first user via an electronic device associated with the first user that has a second set of buttons for receiving user input, and
wherein the number of buttons in the first set is different from the number of buttons in the second set.

52. A non-transitory computer readable medium as recited in claim 46,
wherein the network-based portal allows the first user to receive messages from the second user via an electronic device associated with the second user that has a computer keyboard, and
wherein the network-based portal allows the second user to receive messages from the first user via an electronic device associated with the first user that does not have a computer keyboard.

53. A non-transitory computer readable medium as recited in claim 52, wherein the computer readable medium comprises:
computer program code for determining whether the second user has blocked the first user from using the selected mode of communication to communicate the first message with the second user, via the network-based portal;
computer program code for receiving a notification indication from the first user to the second user via the network-based portal, with the notification indication regarding another message; and
computer program code for enabling the another message to be electronically provided to the second user, in view of the notification indication, even though the second user has blocked the first user from using the selected mode of communication to communicate the first message with the second user.

54. A non-transitory computer readable medium as recited in claim 53, wherein the another message conveys at least urgency.

55. A non-transitory computer readable medium as recited in claim 46, wherein said computer readable medium comprises computer program code for receiving a second message from the second user to the first user, wherein one of the first message or the second message is voice and the other of the first message or the second message is text.

56. A non-transitory computer readable medium as recited in claim 46, wherein said computer readable medium comprises computer program code for enabling the second user to select a predetermined message to send to the first user, the predetermined message being selected from a set of predetermined messages provided to the second user.

57. A non-transitory computer readable medium as recited in claim 46, wherein the contact information associated with the second user includes at least one of a phone number or an email address of the second user.

58. A non-transitory computer readable medium as recited in claim 46,
wherein said computer readable medium comprises computer program code for receiving a second message from the second user to the first user, with one of the first message or the second message being voice and the other one of the first message or the second message being text, and
wherein the contact information associated with the second user includes at least one of a phone number or an email address of the second user.

59. A non-transitory computer readable medium as recited in claim 58, wherein said computer readable medium comprises computer program code for enabling the second user to select a predetermined message to send to the first user via at least one of the plurality of modes of communication, the predetermined message being selected from a set of predetermined messages provided to the second user.

60. A non-transitory computer readable medium as recited in claim 59, the computer readable medium comprises computer program code for enabling a message to be provided to the second user from the first user, with the message based on a mode of communication that is different from the selected mode, even though the second user has blocked the first user from using the selected mode of communication to communicate the first message with the second user.

61. A non-transitory computer readable medium as recited in claim 60, wherein the mode of communication different from the selected mode includes communication with at least an image and communication in an audio manner.

62. A non-transitory computer readable medium as recited in claim 61,
wherein one of the electronic device associated with the first user or the electronic device associated with the second user is a personal computer, and
wherein the other one of the electronic device associated with the first user or the electronic device associated with the second user is a mobile phone.

63. A non-transitory computer readable medium as recited in claim 61, wherein said computer readable medium comprises computer program code for permitting the second user to block the first user from using the mode of communication different from the selected mode to communicate with the second user via the network-based portal, based on the identifier associated with the first user.

64. A non-transitory computer readable medium as recited in claim 46,
wherein the contact information associated with the second user includes at least one of a phone number or an email address of the second user, and
wherein said computer readable medium comprises computer program code for enabling a message to be provided to the second user from the first user, with the message based on a mode of communication that is different from the selected mode, even though the second user has blocked the first user from using the selected mode of communication to communicate the first message with the second user.

65. A non-transitory computer readable medium as recited in claim 64, wherein the mode of communication different from the selected mode includes communication with at least an image and communication in an audio manner.

66. A non-transitory computer readable medium as recited in claim 65, wherein said computer readable medium comprises computer program code for permitting the second user to block the first user from using the mode of communication different from the selected mode to communicate with the second user via the network-based portal, based on the identifier associated with the first user.

67. A non-transitory computer readable medium as recited in claim 65, wherein said computer readable medium comprises computer program code for enabling the second user to select a predetermined message to send to the first user via at least one of the plurality of modes of communication, the predetermined message being selected from a set of predetermined messages provided to the second user.

68. A non-transitory computer readable medium as recited in claim 67,
wherein the first message is a text message,
wherein said computer readable medium comprises computer program code for transforming the first message into an audio message so that the first message is received by the second user in an audio manner via a speaker if the first user is not blocked from using the selected mode of communication to communicate with the second user, and
wherein said computer readable medium comprises computer program code for receiving an audio message from the second user to the first user, and transforming the audio message into a text message to be received by the first user.

69. A non-transitory computer readable medium as recited in claim 46,
wherein the first message is a text message, and
wherein said computer readable medium comprises computer program code for transforming the first message into an audio message so that the first message is received by the second user in an audio manner via a speaker if the first user is not blocked from using the selected mode of communication to communicate with the second user.

70. A non-transitory computer readable medium as recited in claim 69, wherein said computer readable medium comprises computer program code for receiving an audio message from the second user to the first user, and transforming the audio message into a text message to be received by the first user.

* * * * *

(12) INTER PARTES REVIEW CERTIFICATE (4137th)
United States Patent (10) Number: US 10,492,038 K1
Cheung et al. (45) Certificate Issued: Sep. 25, 2025

(54) METHOD AND APPARATUS TO MANAGE MESSAGING PROVIDING DIFFERENT COMMUNICATION MODES DEPENDING ON ONE IDENTIFIER AND NOT REQUIRING AND NOT REQUIRING TO DISCLOSE CONTACT INFORMATION

(71) Applicants: Kwok Wai Cheung; Peter P. Tong; C. Douglass Thomas

(72) Inventors: Kwok Wai Cheung; Peter P. Tong; C. Douglass Thomas

(73) Assignee: INGENIOSHARE, LLC

Trial Numbers:

IPR2022-00294 filed Dec. 7, 2021
IPR2022-00295 filed Dec. 7, 2021

Inter Partes Review Certificate for:

Patent No.: 10,492,038
Issued: Nov. 26, 2019
Appl. No.: 15/704,181
Filed: Sep. 14, 2017

The results of IPR2022-00294 and IPR2022-00295 are reflected in this inter partes review certificate under 35 U.S.C. 318(b).

INTER PARTES REVIEW CERTIFICATE
U.S. Patent 10,492,038 K1
Trial No. IPR2022-00294
Certificate Issued Sep. 25, 2025

AS A RESULT OF THE INTER PARTES REVIEW PROCEEDING, IT HAS BEEN DETERMINED THAT:

Claims 7-12, 22-24 and 33-67 are found patentable.

\* \* \* \* \*